(12) United States Patent
George

(10) Patent No.: US 7,806,695 B1
(45) Date of Patent: *Oct. 5, 2010

(54) JET LAG FORECASTER

(76) Inventor: Peter T. George, 1649 Kalakaua Ave., Suite 204, Honolulu, HI (US) 96826-2494

( * ) Notice: Subject to any disclaimer, the term of this patent is extended or adjusted under 35 U.S.C. 154(b) by 265 days.

This patent is subject to a terminal disclaimer.

(21) Appl. No.: 12/008,776

(22) Filed: Jan. 14, 2008

Related U.S. Application Data

(63) Continuation-in-part of application No. 11/099,542, filed on Apr. 6, 2005, now Pat. No. 7,361,021, which is a continuation-in-part of application No. 10/223,466, filed on Aug. 20, 2002, now Pat. No. 7,351,063.

(51) Int. Cl.
*G09B 19/00* (2006.01)

(52) U.S. Cl. ..................................... 434/236

(58) Field of Classification Search .............. 434/106, 434/107, 188, 198, 199, 236, 405, 428, 430; 600/26, 300
See application file for complete search history.

(56) References Cited

U.S. PATENT DOCUMENTS

| | | | |
|---|---|---|---|
| 3,936,957 A * | 2/1976 | Nordbye | 434/106 |
| 4,140,895 A * | 2/1979 | Tatai | 235/89 R |
| 4,144,446 A * | 3/1979 | Sanders | 235/85 FC |
| 4,228,604 A * | 10/1980 | Cherian | 40/107 |
| 4,349,346 A * | 9/1982 | Bromberg | 493/325 |
| 4,379,698 A * | 4/1983 | Boyd | 434/106 |
| 4,600,723 A * | 7/1986 | Short et al. | 514/416 |
| 4,893,291 A * | 1/1990 | Bick et al. | 368/10 |
| 4,901,296 A * | 2/1990 | Mitchell | 368/185 |
| 4,994,657 A * | 2/1991 | Charwat | 235/70 R |
| 5,398,418 A * | 3/1995 | Jones | 33/1 SD |
| 6,196,455 B1 * | 3/2001 | Robinson | 235/70 A |
| 6,553,252 B2 * | 4/2003 | Balkin et al. | 600/544 |
| 6,663,564 B2 * | 12/2003 | Miller-Kovach et al. | 600/300 |
| 6,886,740 B1 * | 5/2005 | Craig | 235/85 FC |
| 7,118,530 B2 * | 10/2006 | Hursh et al. | 600/300 |
| 7,184,963 B1 * | 2/2007 | Shannon | 705/2 |
| 2005/0021413 A1 * | 1/2005 | Berry et al. | 705/26 |

* cited by examiner

*Primary Examiner*—Kurt Fernstrom
(74) *Attorney, Agent, or Firm*—James Creighton Wray; Meera P. Narasimhan

(57) ABSTRACT

Alertness level is predicted on computers or sliding charts by relationship of sleep drives and wake drives, which are separately moved relative to destination time and time zone differential. Wake drives are moved with home time. Sleep drive is moved with bedtime and sleep debt relative to times and a sleep debt scale, respectively. Resulting displays predict alertness, drowsiness, wake drives in relation to sleep drives, best bedtime, sleep debt and illumination recommendations.

22 Claims, 26 Drawing Sheets

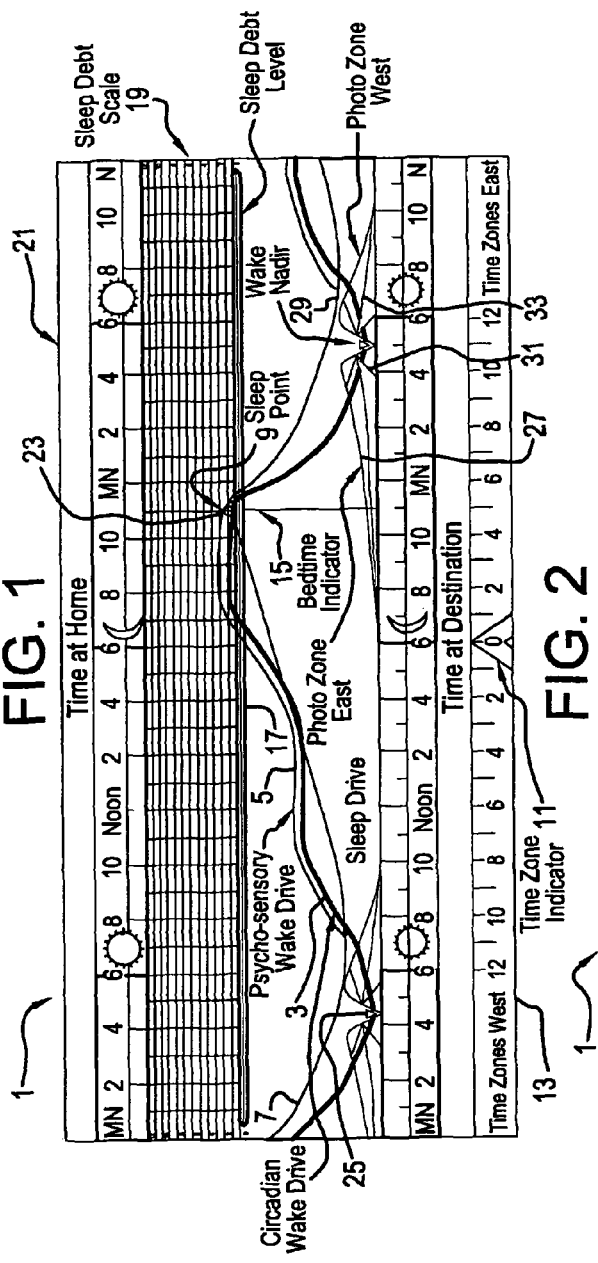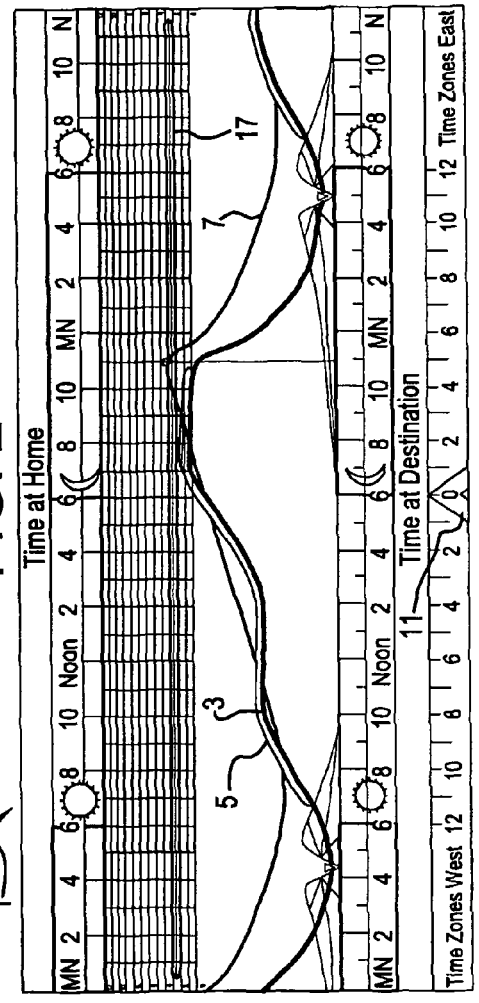

FIG. 30
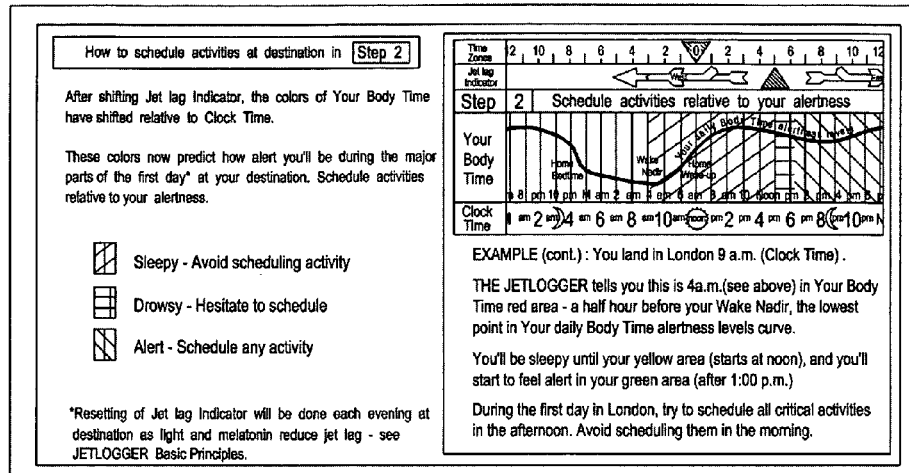
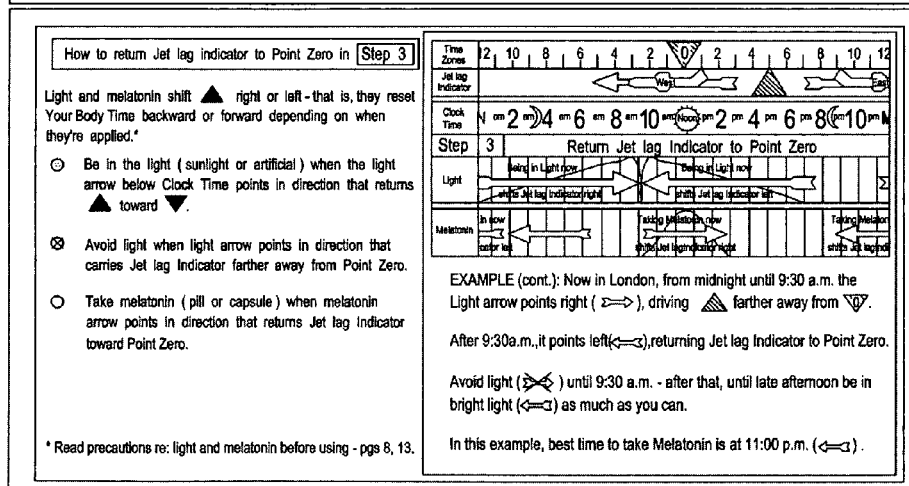
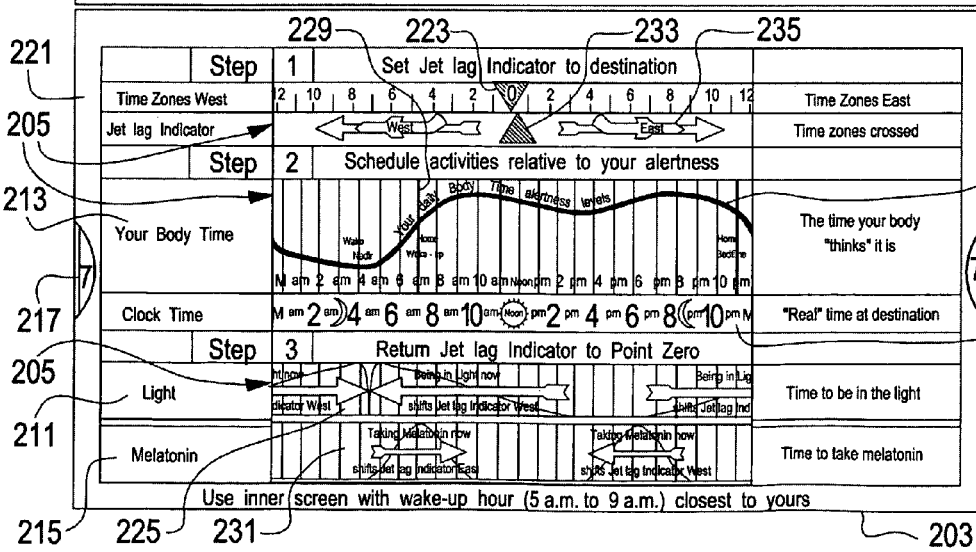

JET LAG FORECASTER

This application is a continuation-in-part of U.S. Ser. No. 11/099,542, filed Apr. 6, 2005 now U.S. Pat. No. 7,361,021, which is a continuation-in-part of U.S. Ser. No. 10/223,466, filed Aug. 20, 2002 now U.S. Pat. No. 7,351,063.

BACKGROUND OF THE INVENTION

All humans go through their lives alternating between the states of sleep and wakefulness. The sleep state is further divided into non-rapid eye movement sleep (NREMS) and rapid eye movement sleep (REMS). The three states, NREMS, REMS, and wakefulness form a Troika of Consciousness Cycle (TCC). Mechanisms in the brain control sleep and alertness in a rhythmic manner, producing the same basic pattern every twenty-four hours, typically eight hours asleep and sixteen hours awake. This daily cycle, or circadian rhythm, is modified by external events: in particular by high-speed air travel traversing several time zones.

There is a need for better means of predicting the effects of air travel on the circadian rhythm so that travelers can better plan their activities to compensate for the changes which result from such travel.

SUMMARY OF THE INVENTION

The invention can be encapsulated in a computer program or other embodiment, such as a nomogram. The present invention is a Jet Lag Forecaster (JLF), Jet Logger, that helps to plan a traveler's activities to take advantage of his/her high and low energy periods which occur at strange times following a long jet flight in a generally east-west direction.

The photo zones east and west are important features of the invention. They indicate the effect that light, either sunlight or artificial, has on the movement of the circadian wake drive in the nychthemeron (a 24 hour period). If a person is exposed to light when a photo zone is over the current time at destination, his circadian wake drive will be accelerated in the direction of the photo zone's arrow. These zones are very important indicators of when to avoid light as well as when to seek light after arriving at the destination.

The lengths and heights of these zones are very carefully drawn to indicate the duration and strength of light's effect on the circadian wake drive. The closer the exposure is to the wake nadir, the stronger the effect of the light. However, within a half hour on either side of the wake nadir it is difficult to tell in which direction light will push the circadian wake drive. After the photo zone west tapers down, light has a nil effect on the placement of the circadian wake drive until photo zone east starts to build up.

The invention includes a method and apparatus to predict and plan activity levels after rapid changes in time zones, a method to accelerate the movement of the circadian wake drive toward local time and a method to prevent inadvertent movement of the circadian wake drive away from local time, all for providing more rapid recovery from jet lag.

These and further and other objects and features of the invention are apparent in the disclosure, which includes the above and ongoing written specification, with the claims and the drawings.

BRIEF DESCRIPTION OF THE DRAWINGS

FIG. 1 shows a Jet Logger chart made of moveable transparent overlays showing times, time zone shift, sleep and wake drives, sleep debt, bedtime and wake nadirs, with the sleep debt level and time zone indicator both at zero.

FIG. 2 shows a Jet Logger chart similar to FIG. 1, showing increased sleep debt and sleep drive with the time zone shift indicator at zero and the sleep debt level at 3.

FIG. 30 is another alternative embodiment showing a rectangular form and associated instructions.

DETAILED DESCRIPTION OF THE PREFERRED EMBODIMENTS

How to Use the Jet Logger

Referring to FIGS. 1-27, the Jet Logger 1 will make the next trip a more rewarding experience. One will be able to plan the activities to take advantage of the high and low energy periods that occur at strange times after a jet flight. The purpose of these instructions is simply to show one how to adjust the Jet Logger 1. They will give only minimal advice on the nature and timing of activities one can do before taking off, during flight, and after landing to minimize or compensate for the accompanying unwanted symptoms. When and how to schedule these activities will depend upon business, competition or pleasure priorities. Armed with this knowledge, the Jet Logger 1 is a powerful tool to ensure a rewarding trip.

Once one knows what the different lines and shapes represent, and understands a few simple principles, adjusting the Jet Logger 1 is intuitive. Keep the instrument handy while reading these instructions in order to repeat the example adjustments.

These instructions assume a normal sleep-wake cycle and a usual wake up time and bedtime within an hour and a half of 7:00 am and 11:00 pm.

Lines and Shapes

As shown in FIGS. 1-24, a person has two wake drives 3 and 5 that work together trying to make the person alert and one sleep drive 7 that tries to make the person sleep. These drives compete with each other for dominance over a person twenty-four hours a day. Only the one on top determines whether the person is awake or asleep.

The circadian wake drive 3 is the dark line that undulates across the chart 21. It rolls along the same up and down path at the same time every day as long as one stays in the same time zone. When a person lands in a new time zone, that person's circadian wake drive 3 will still be rolling along in time with the clock at home, but it will start shifting to conform to the new local time. This shift usually occurs at the rate of one time zone per day. Until this change is complete, a person will be experiencing jet lag.

Figure 3:
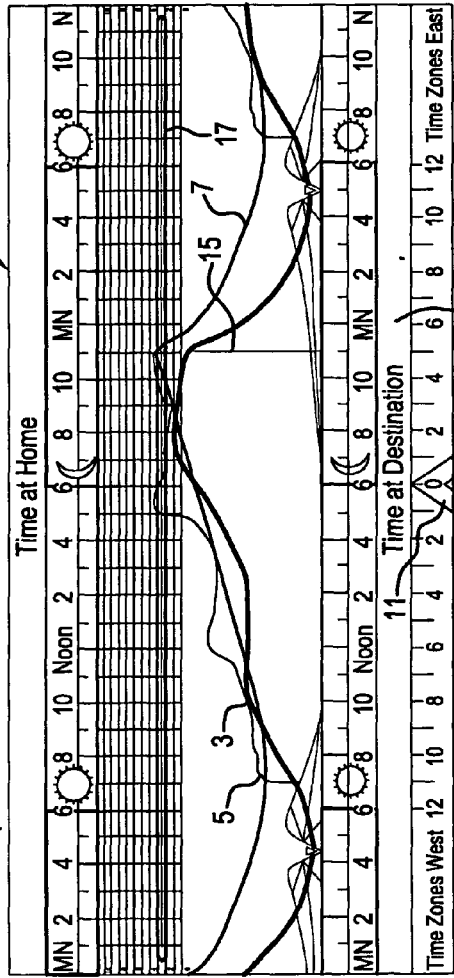
FIG. 3 shows a Jet Logger chart similar to FIG. 2 with the time zone indicator at zero and the sleep debt level at three hours and with varied psycho-sensory wake drive and deepened wake nadir.

The psycho-sensory wake drive 5 is the dark line covering the circadian wake drive. The psycho-sensory wake drive 5 can expand to reinforce the circadian wake drive when a person wants to stay awake, or it can contract when a person wants to sleep. Its strength can vary from minute to minute as shown in FIG. 3 depending upon the amount of stimulation it gets from a person and the person's environment.

The sleep drive 7 is the dark wave-like area. The sleep drive's strength is determined only by the amount of sleep a person gets. A sleep drive 7 increases while a person is awake and decreases while a person is asleep. As seen by comparing FIGS. 1 and 2, a sleep drive 7 increases as sleep debt 17 increases.

The time zone indicator 11 is the triangle on the time zone scale 13 at the bottom of the chart 21. Sliding the time zone indicator 11 right or left indicates the direction and number of time zones a person will cross on a trip. If no anti jet lag measures are taken, after each day at destination move time zone indicator 11 back one time zone towards the center.

The bedtime indicator 15 is the vertical line passing through the peak 9 of the wave-shaped sleep drive 7. Using 11:00 pm as bedtime at home, a person obtains a good jet lag forecast if regular bedtime is at a destination within an hour and a half of that time.

The sleep debt level 17 is a horizontal bar passing through the peak 9 of the sleep drive 7.

The sleep debt scale 19 is the rectangular grid in the top half of the chart 21. The number of hours of insufficient sleep is recorded as sleep debt by moving the sleep debt level 17 upward on this scale.

The sleep point 23 is where the bedtime indicator 15 crosses the top of the sleep debt level 17. Sleep point 23 indicates a person's sleep debt level 17 on sleep debt scale 19 at bedtime 15. The later a person goes to bed, the larger the person's sleep debt. Likewise the earlier a person goes to bed, the smaller it is. Therefore, to keep the sleep point 23 in its proper place, a person must move the sleep debt level 17 up or down as many rows as the number of hours the bedtime indicator 15 is moved right or left respectively.

The wake nadir 25 is the small triangle at the lowest point on the circadian wake drive 3. It indicates the most difficult time to stay alert. At home, the wake nadir 25 usually occurs between 4:00 and 5:00 am, but after jet travel it can occur at any hour.

The photo zones east 27 and west 29 are the two light curves covering arrows 31 and 33 just before and just after the wake nadir 25. Exposure to light during the time zones covered by either of these photo zone curves 27, 29 will shift the circadian wake drive 3 in the direction indicated by the related arrow 31, 33. The closer the light exposure is to the wake nadir 25 the greater is the shift, however, it is difficult to predict the direction of the shift when the exposure is very near the wake nadir.

Accumulation of Sleep Debt

It is normal to have up to four hours sleep debt 17. A person accumulates one hour sleep debt for every hour the person sleeps less than the usual amount, and a person accumulates a half hour sleep debt for every one hour of poor quality sleep. However, if a person sleeps more than the person's usual amount, the person subtracts one hour from the person's sleep debt for every extra hour the person sleeps. When calculating sleep debt level 17, hours are rounded off to the nearest whole number.

At Home with No Sleep Debt

In FIG. 1, the sleep debt level 17 and time zone indicator 11 are both at zero. This tells that the person depicted is highly alert, for example between the hours of 7:00 am and 11:00 pm in his home time zone. The relative heights of the wake drive 3, 5 and sleep drives 7 are important. The higher on the chart 21a wake drive 3, 5 or sleep drive 7, the stronger it is. When a person's wake drives 3, 5 are high above the sleep drive 7 the person is very alert. When a person's wake drives 3, 5 are close to the sleep drive 7, the person is drowsy. When a person's sleep drive 7 is above both the wake drives 3, 5, the person is asleep. FIG. 1 shows the ideal position of the circadian wake drive 3 relative to the sleep drive 7. Notice that both rise and fall at the same times.

In FIG. 1 the sleep drive 7 is below the circadian wake drive 3 during all parts of the day. No expansion of the psycho-sensory wake drive 5 is necessary to stay awake.

Volatility of the Psycho-Sensory Wake Drive

The main cause of jet lag is a displaced circadian wake drive 5. The circadian wake drive 5 tends to remain aligned with the at home when a person is at another location or destination in a different time zone. Jet lag is usually aggravated by an excessive sleep debt. A person's psycho-sensory wake drive 5 neutralizes the symptoms of jet lag by expanding, as shown in FIG. 3. Its results, however, are not without limit or effort. To help a person understand how the psycho-sensory wake drive 5 can combat these symptoms, let us first look at how it functions at home in a normal individual with a three hour sleep debt.

Move the sleep debt level 17 upward three hours as shown in FIG. 2. Notice that the sleep drive 7 is now above the wake drives 3, 5 between 7:00 and 8:00 in the morning, 12:30 and 5:00 in the afternoon, and 9:30 and 11:00 at night. This is normal, but if no adjustments are made to the subject's wake and/or sleep drives the subject would be asleep at these times. The subject cannot immediately change the strength of his circadian wake drive 3 or his sleep drive 7. It takes days to change them, but the strength of his psycho-sensory wake drive 5 can be changed in seconds, as shown in FIG. 3. Anything that stimulates him physically or mentally increases its strength. These stimulants include alarm clocks, lights, coffee, physical activity, conversation—the list is endless. There is also a long list of factors that decrease its strength, like silence, darkness, alcohol, sleeping pills, physical inactivity, anything monotonous.

Typical Psycho-Sensory Wake Drive Reactions to Daily Events.

Let's follow the subject from wake up in the morning to bedtime at night on his birthday (FIG. 3). The subject is awakened at 7:00 am by an alarm clock that shoots his psycho-sensory wake drive 5 above his sleep drive. He gets ready for the day, eats breakfast, and drives to work. Boring paper work causes his psycho-sensory wake drive 5 to dip around 10:00 am, but he won't doze off at this time because his circadian wake drive 3 is higher than his sleep drive. An exciting lunch date at noon perks up his psycho-sensory wake drive 4, but the aftereffects of the luncheon cocktail plus duller paper work reduce it during mid afternoon. He is very drowsy between 3:00 and 4:00 pm. At 5:00 pm his office surprises him with a birthday party. He has dinner and a glass of wine at 7:00 pm and watches TV the remainder of the evening. His psycho-sensory wake drive 5 gradually declines until 9:00 pm when he momentarily dozes off. Immediately after that an exciting movie appears on TV and he perks up until it ends at 11:00 pm.

As can be seen, the psycho-sensory wake drive 5 is affected by various stimulants and depressants throughout the day. A person can control some of these stimulants but not others. The Jet Logger 1 does not show the expansion and contraction of the psycho-sensory wake drive 5. A person will know how much wake drive 5 is needed in every hour of the day at the destination just by looking at the relationship of the circadian wake drive 3 to the sleep drive. As the person will see in the examples below, with reference to FIGS. 4-24, the need for psycho-sensory wake drive 5 will occur in very different times at the destination than it does at home.

The sleep-wake scenarios that a person can encounter when jet traveling are endless, depending upon the direction of travel, the number of time zones 12 crossed, the size of the person's sleep debt 17, the person's bedtime 16 and the person's wake up time 18 at destination 20. The few examples given below are sufficient to show how to adjust the Jet Logger 1.

Jet Logger Adjustments for all Trips

Before Departure

1. Move the sleep debt level 17 to indicate sleep debt at start of trip.

2. Move the time zone indicator 11 east or west as many time zones 12 as will be crossed, and return the bedtime indicator 15 to 11:00 pm at home time 22.

On Arrival

3. Move the sleep debt level 17 up or down to adjust for amount of sleep during flight. If day flight, reduce sleep debt level 17 one row for each hour slept. If night flight reduce or increase sleep debt level 17 one row for each hour slept more or less than usual night at home respectively.

First Night after Arrival

4. Move the sleep point 23 and bedtime indicator 15 to bedtime at the destination time 24. Move the sleep point 23 and the sleep debt indicator up or down on the sleep debt scale 19 as many rows as the number of hours the bedtime indicator 15 is moved right or left respectively.

First Morning at Destination

5. Move the sleep debt level 17 up or down depending on quantity and quality of the last night's sleep. Move the debt level indicator 17 upward one hour above the level in step 4 for every hour slept less than in a usual night at home, and one hour upward for every two hours of poor quality sleep. Move the debt level indicator 17 downward one hour for every hour slept more than in a usual night at home.

6. Move the time zone indicator 11 one to two time zones towards zero. Usually, the circadian wake drive 3 returns to normal at the rate of about one time zone per day. Light exposure during the photo zones can retard or accelerate that rate depending on the direction of the appropriate arrow 31, 33 in the photo zone.

Each Next Night and Morning

Repeat steps 4-6 until back to normal sleep-wake schedule and the time zone indicator 11 is at zero.

When returning home one repeats the steps 1-6.

Examples of Jet Logger Adjustments.

Eastbound, Three Time Zones, Daytime Flight.

Figure 4:
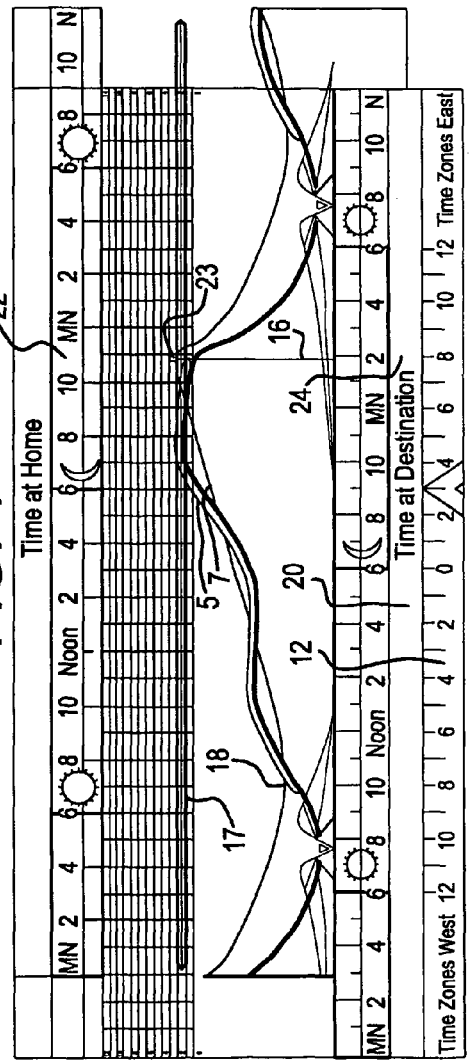
FIG. 4 shows a Jet Logger chart with showing effects of a three-hour easterly time zone indicator shift and the sleep debt level at two hours.
Figure 5:
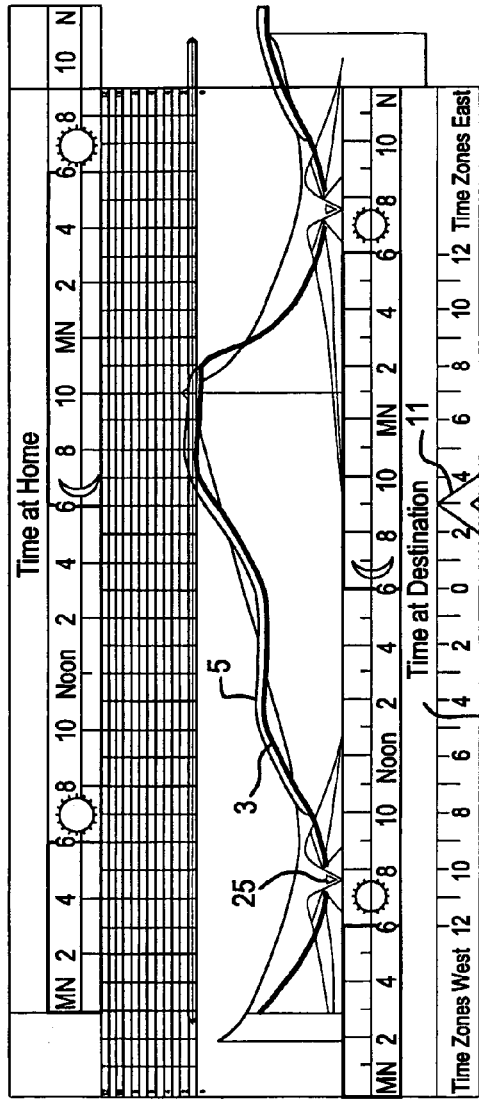
FIG. 5 shows a Jet Logger chart similar to FIG. 4 showing effects of lessening of sleep debt with the time zone indicator shifted three hours to the east and the sleep debt level at one hour.
Figure 6:
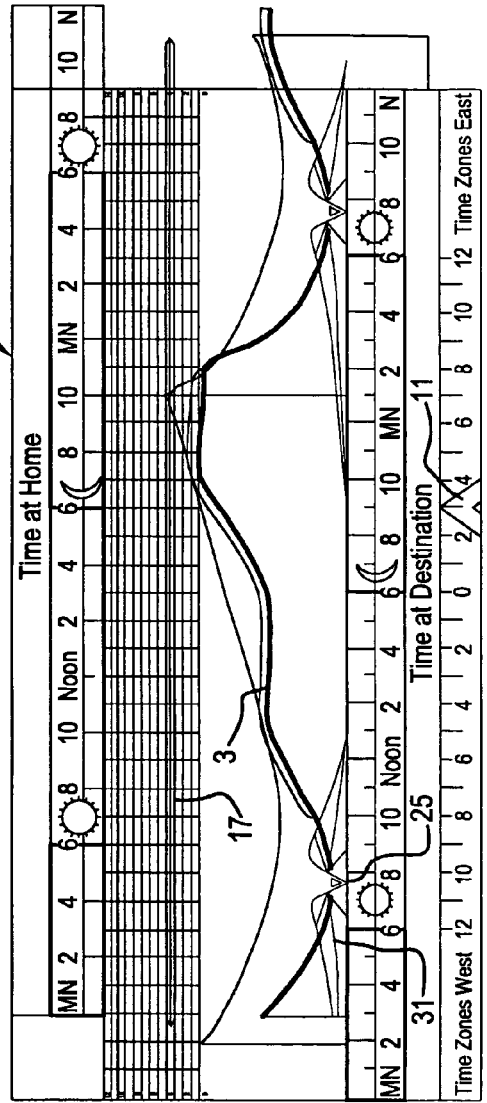
FIG. 6 shows a Jet Logger chart similar to FIG. 5 showing effects of increasing of sleep debt with the time zone indicator shifted three hours to the east and the sleep debt level at four hours.
Figure 7:
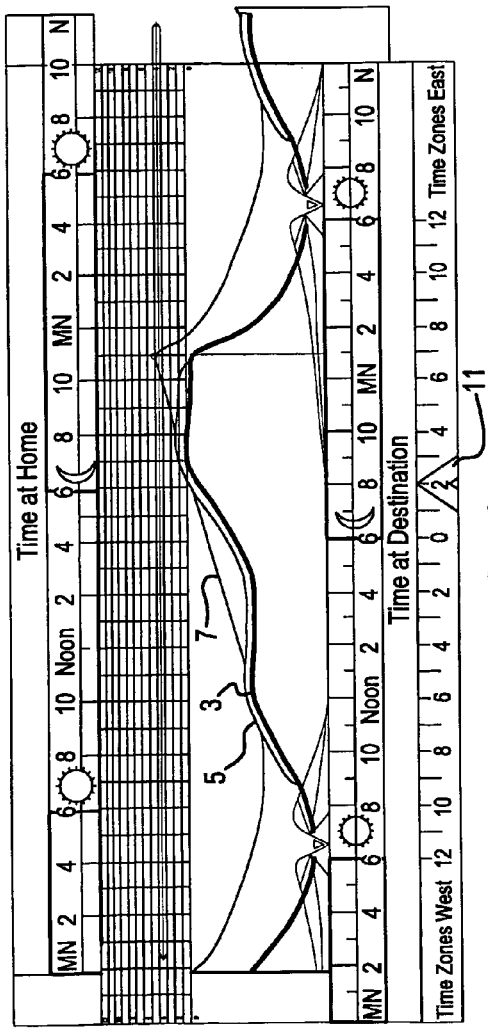
FIG. 7 shows a Jet Logger chart similar to FIG. 5 showing effects of increasing of sleep debt with the time zone indicator at a two-hour easterly shift and the sleep debt level at four hours.
Figure 8:
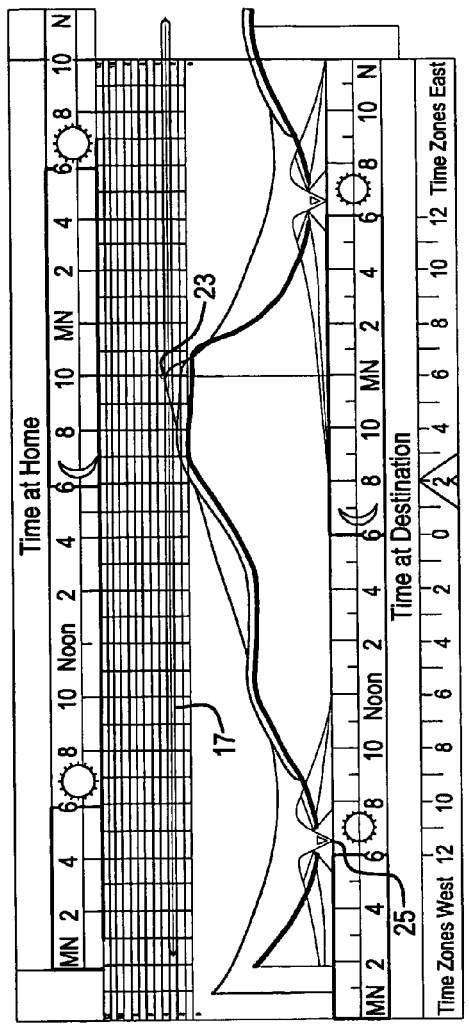
FIG. 8 shows a Jet Logger chart similar to FIG. 7 with the time zone indicator shifted two hours to the east and the sleep debt level at three hours.
Figure 9:
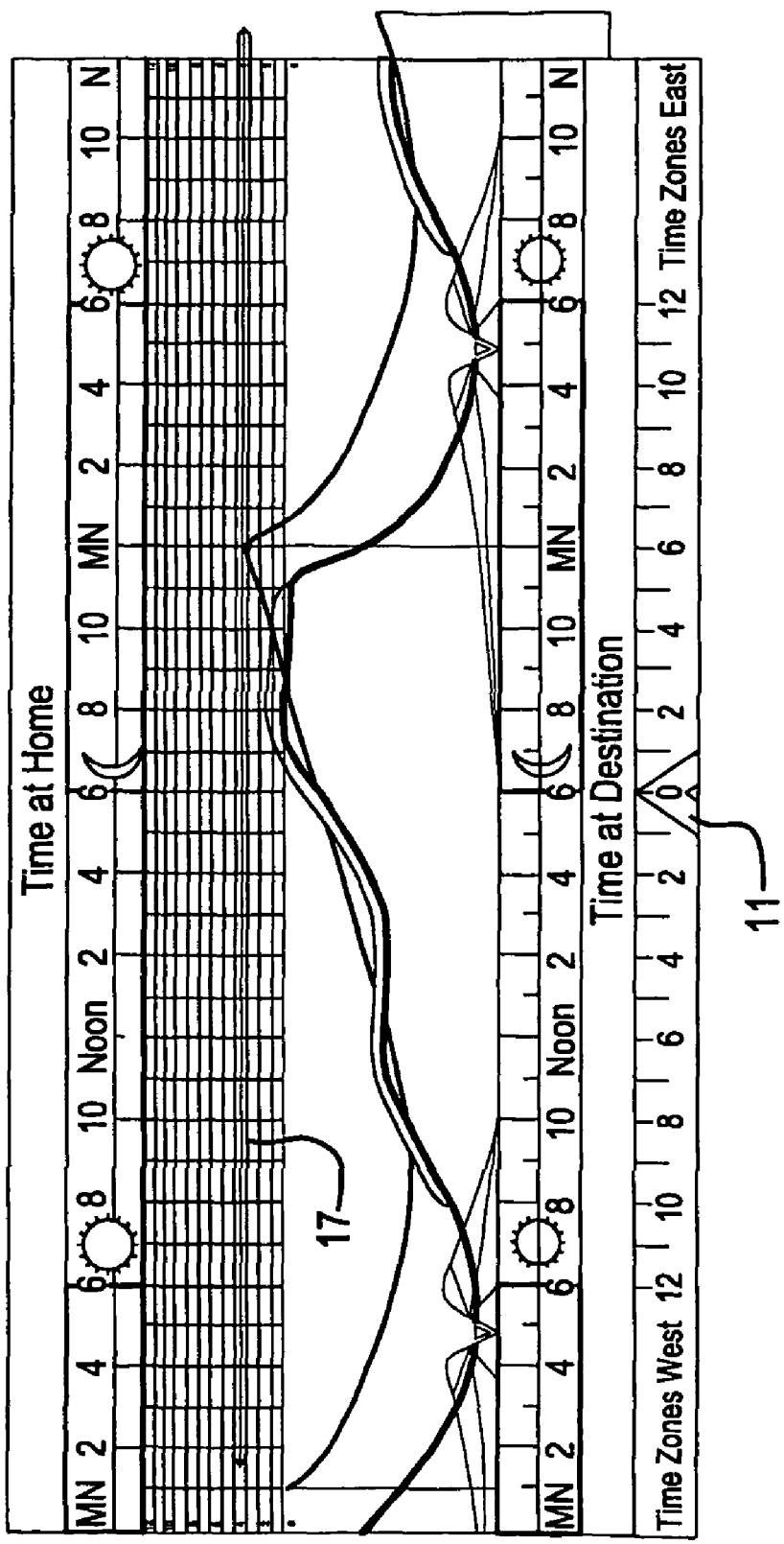
FIG. 9 shows a Jet Logger chart with the time zone shift indicator at zero and the sleep debt level at four hours.
Figure 10:
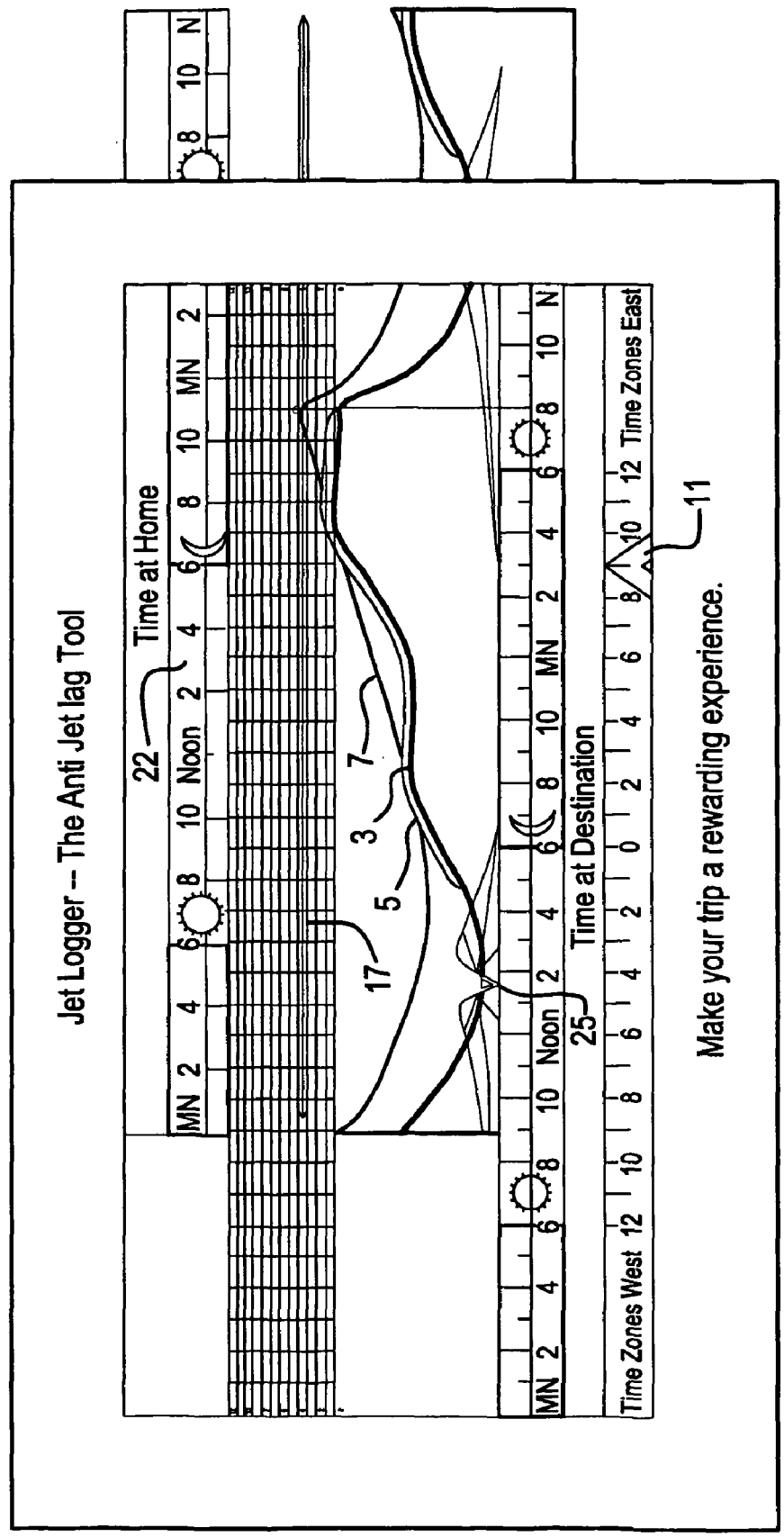
FIG. 10 shows a Jet Logger with the time zone shift indicator at nine hours to the east and the sleep debt level at four hours.
Figure 11:
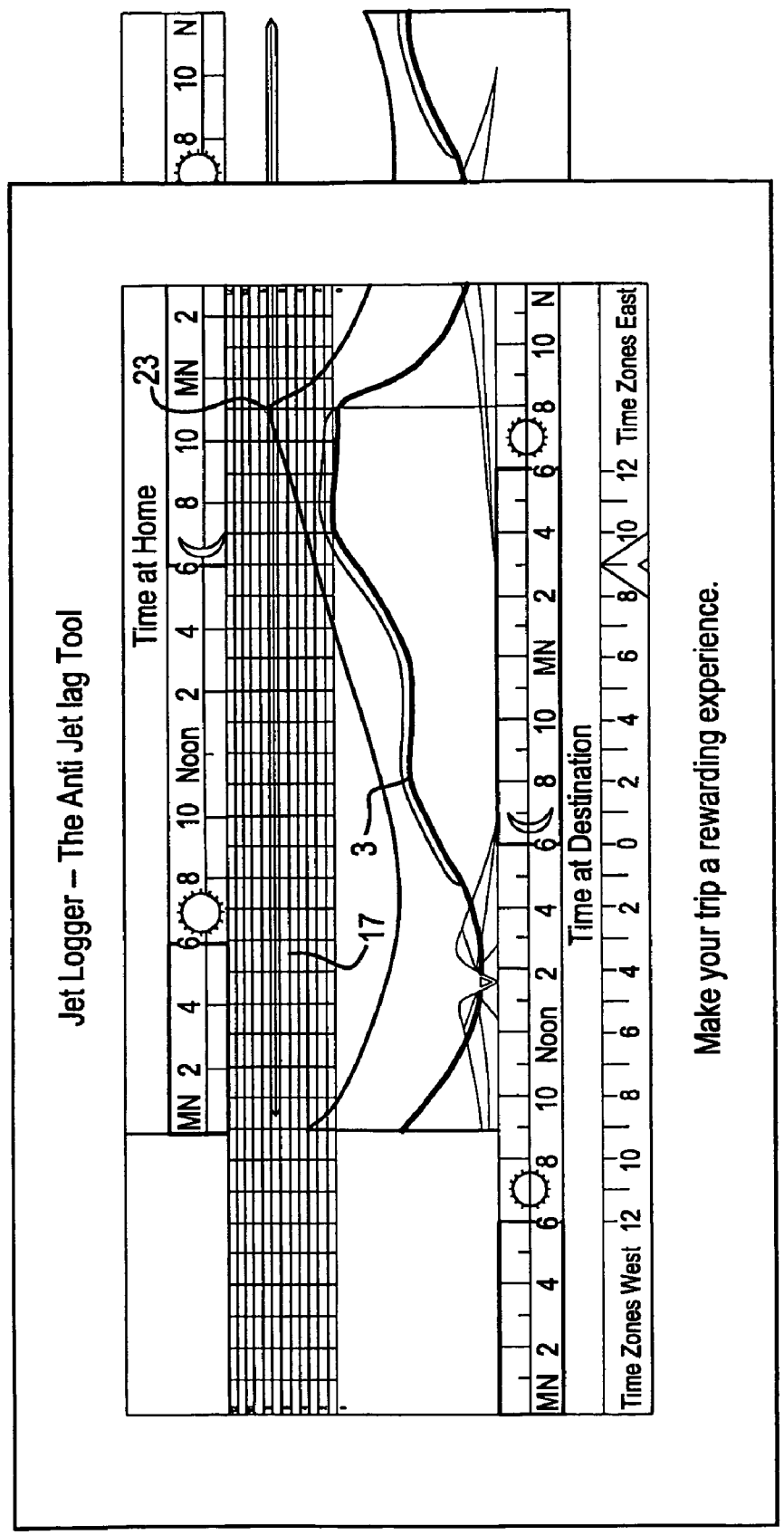
FIG. 11 shows a Jet Logger chart with the time zone shift indicator at nine hours to the east and the sleep debt level at seven hours showing effects on the drives and nadir of increased sleep debt.

Before Departure, as Shown in FIG. 4:

1. Move the sleep debt level 17 to row 2 to indicate two hours of sleep debt 17 (assuming the person is alert normal).

2. Move the time zone indicator 11 three zones rightward and return the bedtime indicator 15 to 11:00 pm at home.

On Arrival

3. No adjustment is made to sleep debt level 17 (assuming person did not sleep on the flight). The Jet Logger 1 now should look like FIG. 4. Notice that 11:00 pm at home time 22 is 2:00 am at destination time 20. Also notice that at midnight at destination time 20, the person's sleep drive 7 is just below the person's circadian wake drive 5. A person would have difficulty falling asleep at that time.

First Night after Arrival

Let us say the person decides to go to bed at 1:00 am. Look at FIG. 4 to see where the person's sleep drive 7 is at 1:00 am. That is where the sleep point 23 must now be moved to, 10:00 pm at home time 22.

4. Move the sleep point 23 one hour leftward to 1:00 am destination time 20 and 1 row downward to indicate one less hour sleep debt 17 (the hour between 2:00 am and 1:00 am destination time 20). The Jet Logger 1 now should look FIG. 5.

First Morning at Destination

The person sleeps until 7:00 am destination time 20 the next morning and the person's sleep debt 17 is larger for two reasons: 1) the person slept two hours less (1:00 to 7:00) than the usual eight hour amount, and 2) the person's Jet Logger 1 indicates (FIG. 5) that the quality of sleep between 1:30 and 2:30 am was poor.

5. Move sleep debt level 17 upward three additional hours to row 4 (2 for quantity and 1 (one hour halved then rounded upward) for quality of sleep). The Jet Logger 1 should look like FIG. 6. Notice that the person needed an alarm to wake up at 7:00 am. Also notice that the person's wake nadir 25 is now at 7:30 am. Light exposure before that time moves (arrow 31) the person's circadian wake drive 3 further eastward. Light exposure after that time would return it to the west. Jet lag is reduced when the triangular time zone indicator 11 at the bottom on the chart 21 moves towards zero. Therefore a person exposes himself to light when in the photo zone whose arrow point in the direction that will push or pull the time zone indicator 11 towards zero. The person avoids light when the arrow will move it away from zero. In that case one tries to avoid light before 7:30 am, and tries to get as much light as possible between 8:00 am and noon.

6. Move the time zone indicator 11 one time zone leftward to time zone 2. This person was unable to get out in the bright sunlight, but was exposed to the equivalent of office lighting. The Jet Logger 1 should now look like FIG. 7. Notice that after rising to an alarm at 7:00 am a person will need to expand the psycho-sensory wake drive 5 to keep alert until late morning and during the midday circadian wake drive dip, which will now occur around 5:00 pm. A person will not need much psycho-sensory wake drive 5 to be alert around 9:00 pm.

Second Night.

Repeat step 4. Although FIG. 7 indicates that a person could fall asleep at 11:00 pm, the evening circadian wake drive plateau 5 would soon wake the person up. The person would do better to go to bed at midnight (10:00 pm at home, time 22).

4a. Move the sleep point 23 one hour leftward to midnight and one row downward to indicate three hours sleep debt. The Jet Logger 1 should look like FIG. 8.

Second Morning.

Repeat steps 5-6. Except for a brief period between 1:30 and 2:00 am last night, the quality of the person's sleep was good, but the person slept one hour less (12:00 to 7:00) than the usual eight hour amount.

5a. Move the sleep debt level 17 upward one hour to row 4. The person's wake nadir 25 is now at 6:30 am. Since the person slept until 7:00 am, the person avoided light before the wake nadir. It was a bright sunny day. The person had breakfast in front of a large window and spent the entire morning outdoors.

6a. Move the time zone indicator 11 two time zones leftward to time zone O. The Jet Logger 1 should now look like FIG. 9. The person should have no remaining jet lag. The sleep debt level 17 is high normal, and the person should have no difficulty going to sleep at 11:00 pm or an hour earlier to reduce the sleep debt.

Eastbound, Nine Time Zones, Night Plus Daytime Flight

A person will depart late afternoon and arrive at the destination the next day at 4:00 pm.

Before Departure

1. Move the sleep debt level 17 to row 4 (assuming the person has a high normal sleep debt).

2. Move the time zone indicator 11 nine time zones to the right, and return the bedtime indicator 15 to 11:00 pm at home time 22. The Jet Logger 1 should look like FIG. 10. Notice that the person's wake nadir 25 is at 1:30 pm destination time 20. During the flight if one is sitting next to a window, one should keep the shade down until that time, then raise it and look at the white clouds. Never look directly at the sun. One should try to keep exposed to bright light until late afternoon. From 7:00 pm until 4:00 am, destination time, light exposure will have negligible effect on the circadian wake drive 3.

On Arrival

During the flight the person slept three hours less than the usual amount at home.

3. Move the sleep debt level 17 upward three hours to row 7. The Jet Logger 1 now should look like FIG. 11. Notice that 9:00 pm at destination is noon at home. Since the person has seven hours sleep debt, the person will not have any difficulty falling asleep any time after arrival. But, the circadian wake drive 3 is rising during that time so the person would not sleep very long. The chances of continuous sleep are slight before 4:00 am, which is 7:00 pm at home. That's when the circadian wake drive 3 starts to level off before declining. It is important not to nap during this day, since napping would reduce the sleep drive, which is necessary to enable the person to sleep that night.

First Night after Arrival

Let us say a person decides to go to bed at 4:00 am. Observe in FIG. 11 where the sleep drive 7 will be at that time. That is where the sleep point 23 must now be moved.

4. Move the sleep point 23 four hours leftward to 4:00 am and four rows downward to indicate three hours sleep debt 17.

Figure 12:
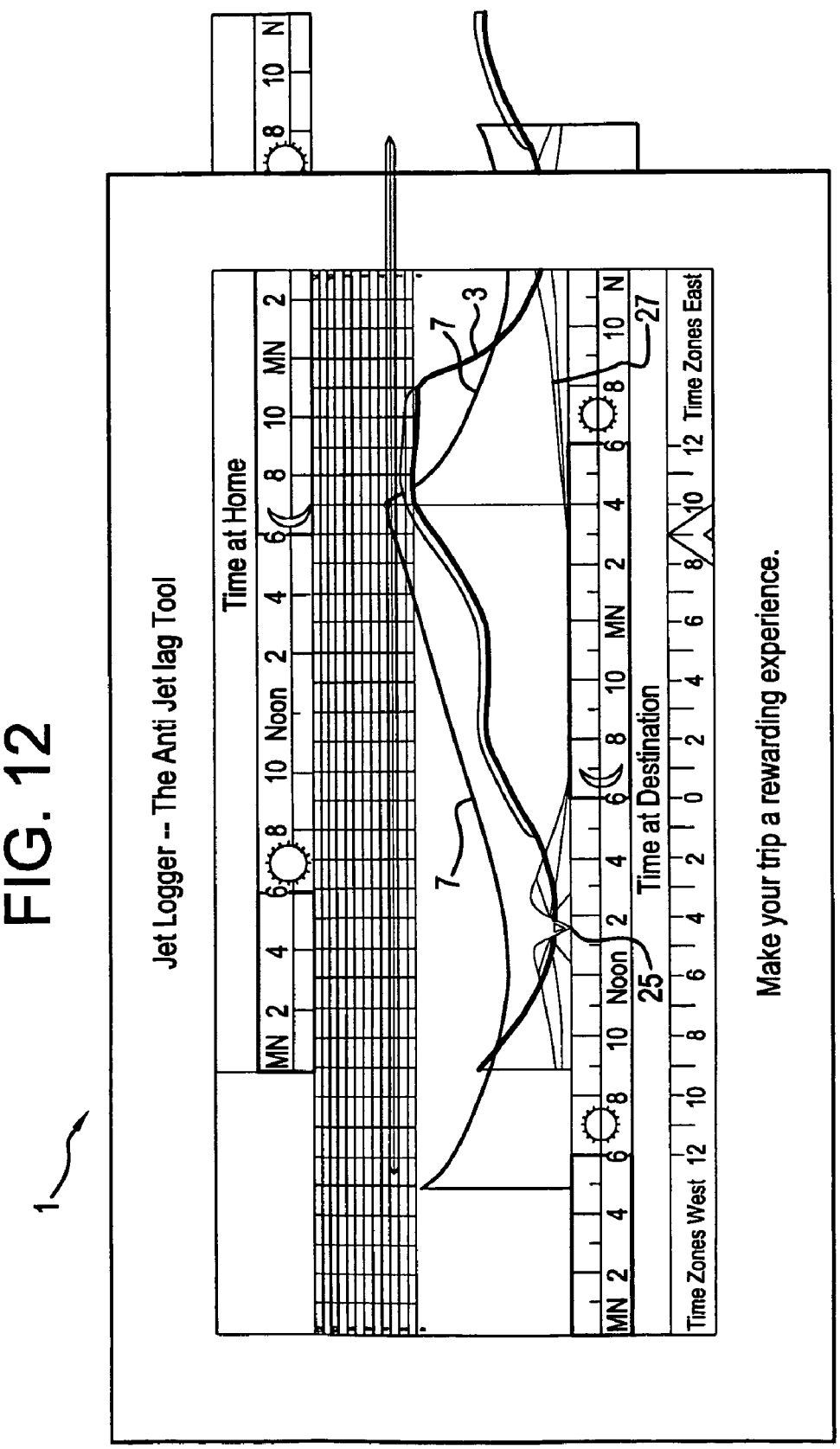
FIG. 12 shows a Jet Logger chart with the nine-hour time zone shift and the sleep debt level at three hours.
Figure 13:
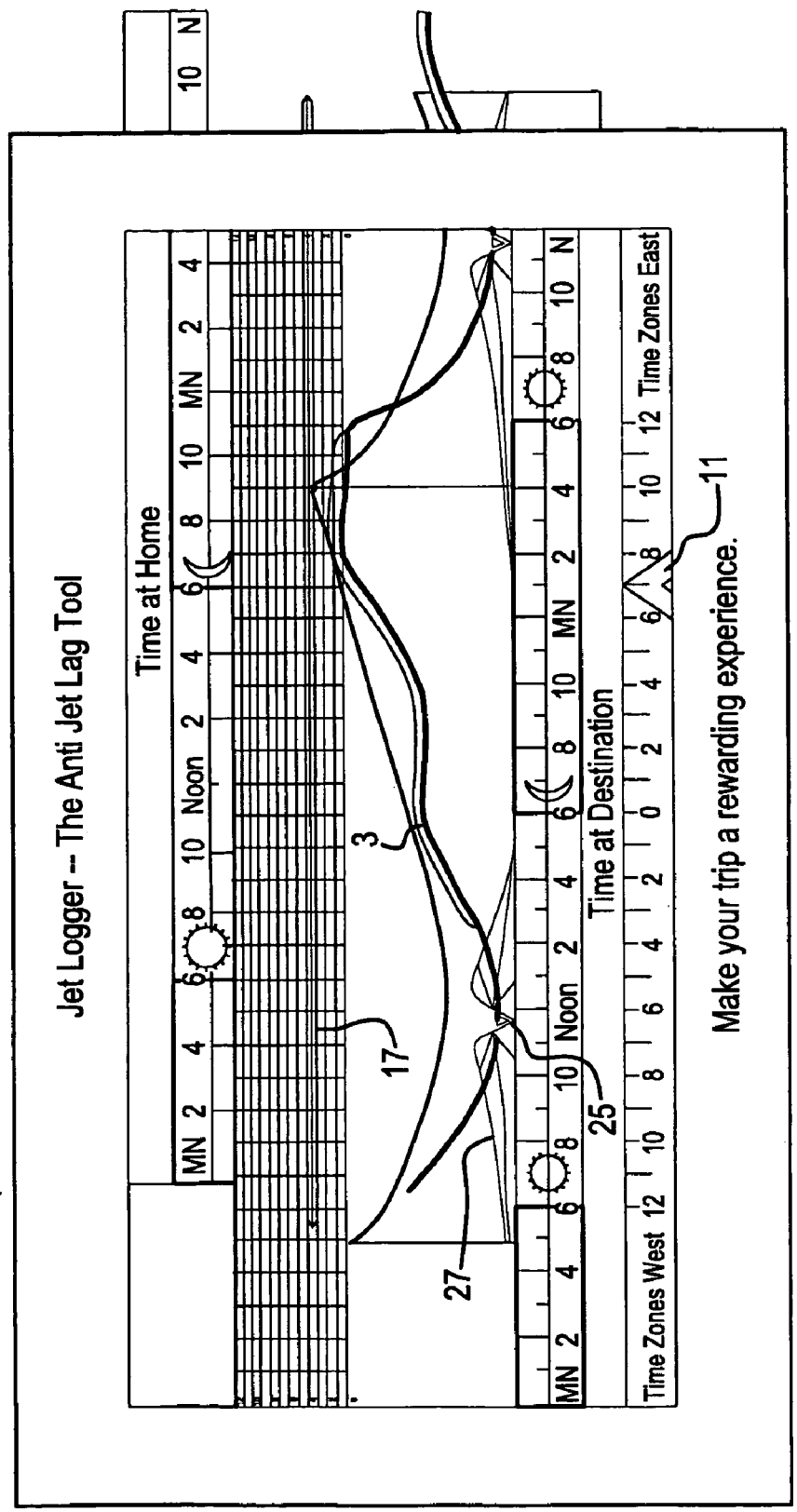
FIG. 13 shows a Jet Logger chart with the time zone indicator at seven hours east and the sleep debt level at four hours.
Figure 14:
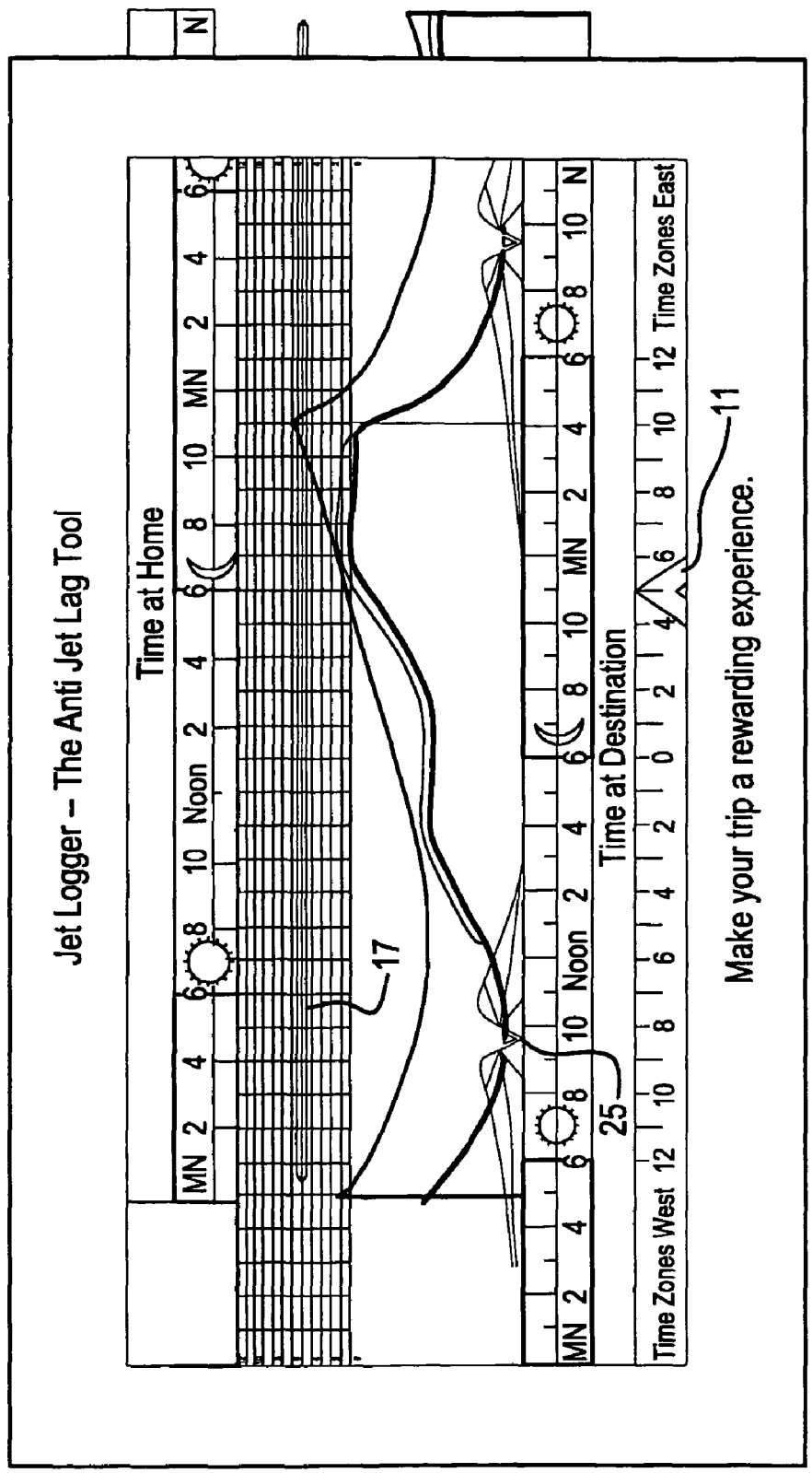
FIG. 14 shows a Jet Logger chart with the time zone indicator at five hours east and the sleep debt level at six hours.
Figure 15:
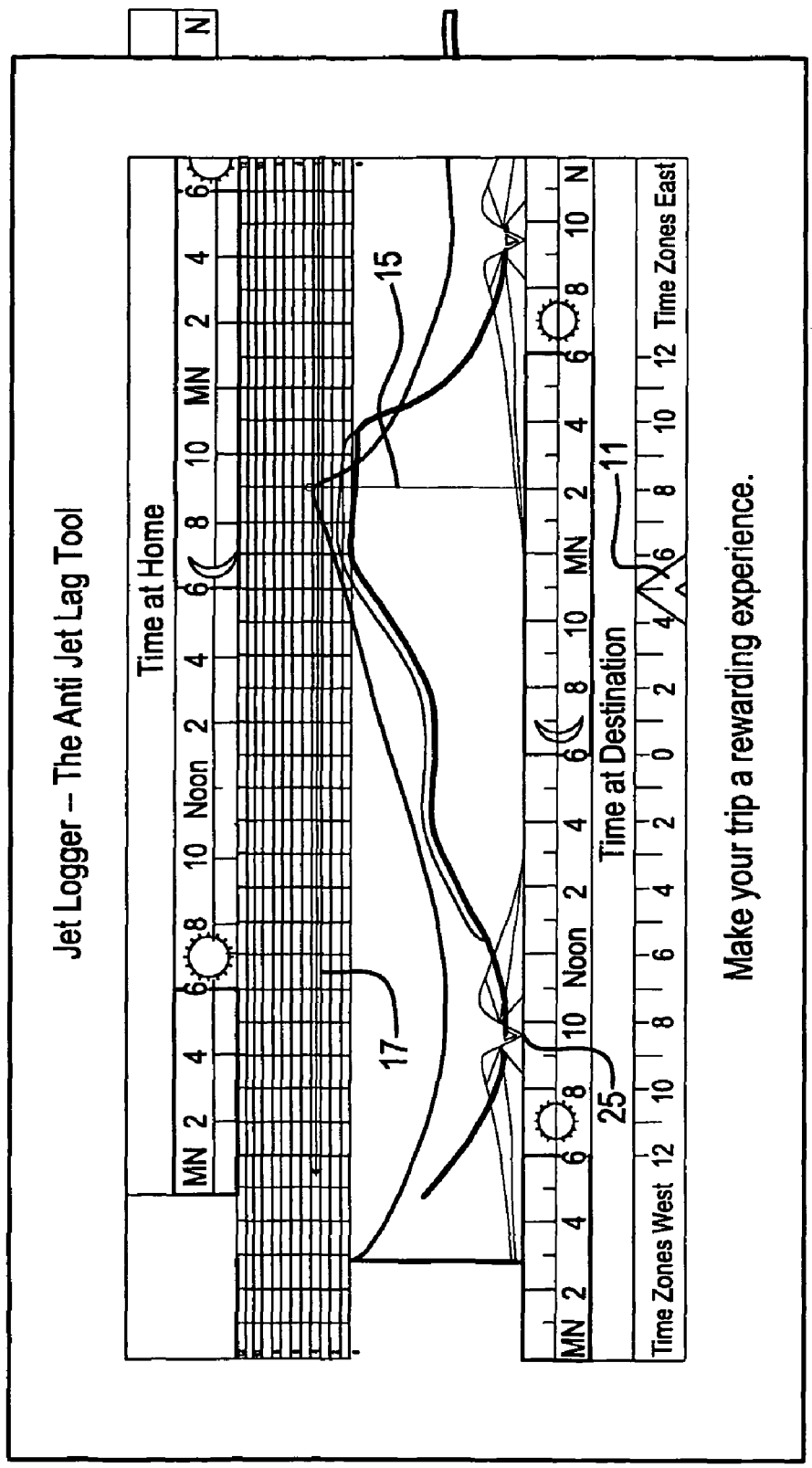
FIG. 15 shows a Jet Logger chart with the time zone indicator at five hours east and the sleep debt level at four hours.
Figure 16:
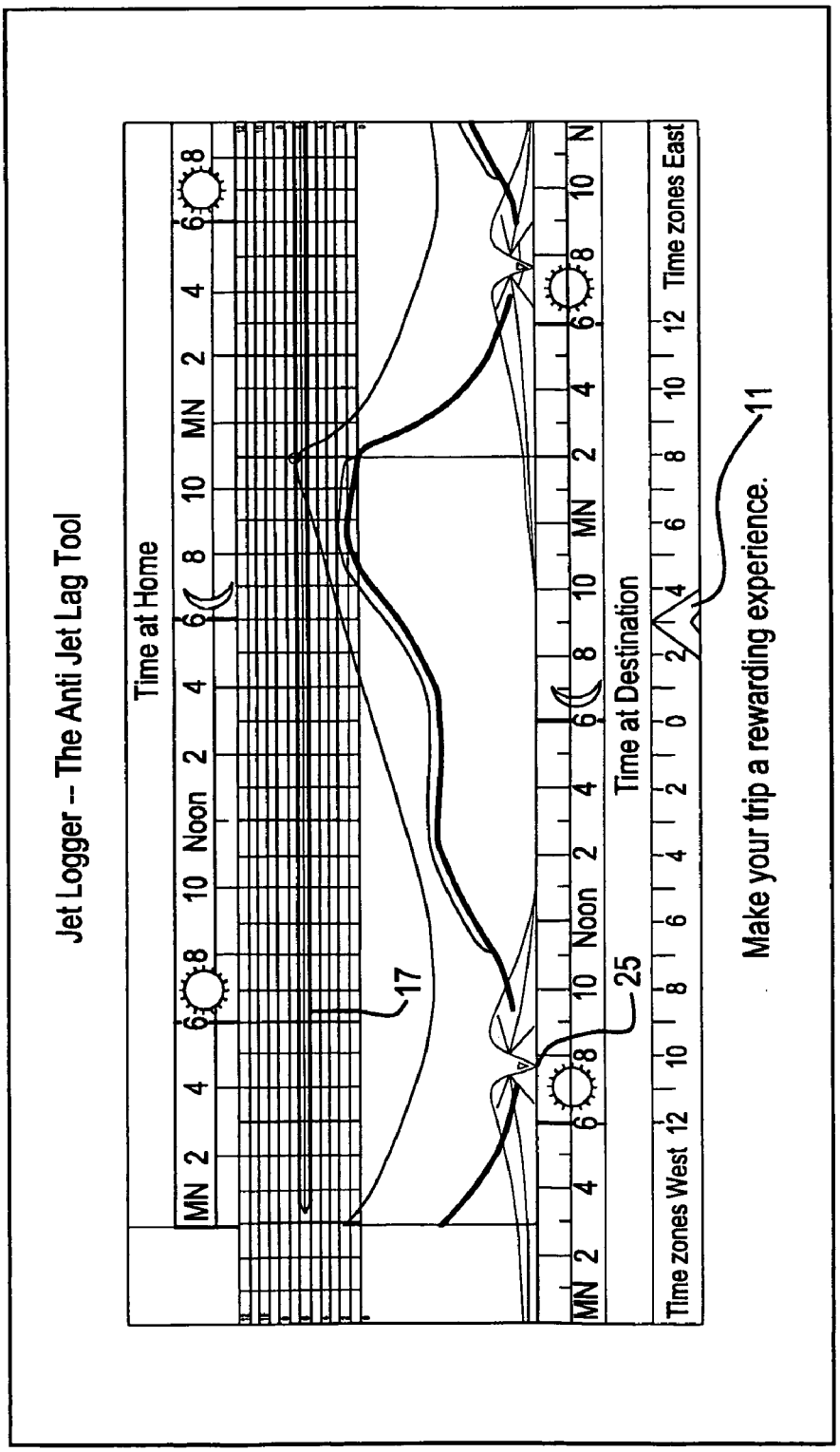
FIG. 16 shows a Jet Logger chart with the time zone indicator at three hours east and the sleep debt level at six hours.
Figure 17:
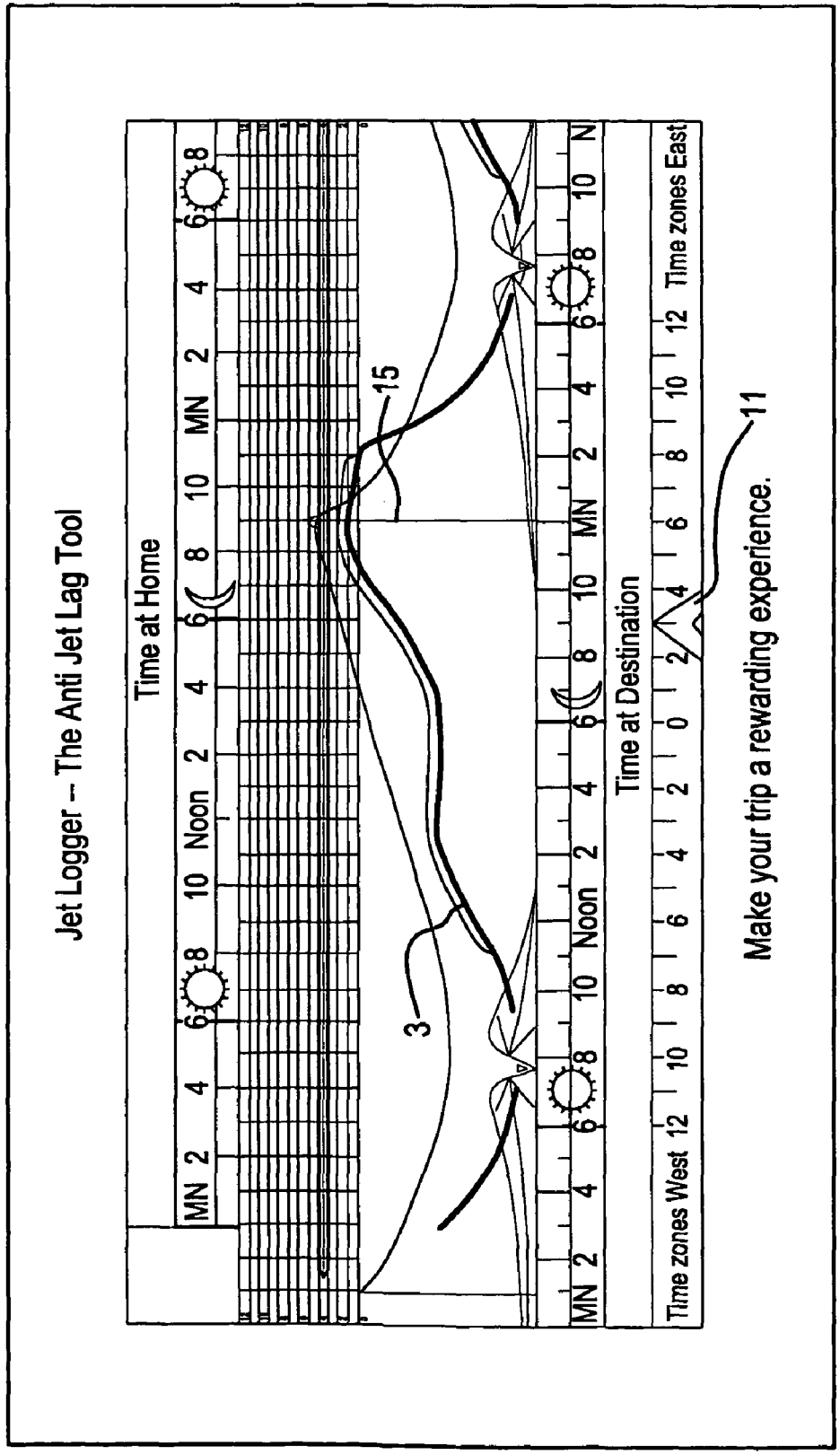
FIG. 17 shows a Jet Logger chart with the time zone indicator at three hours east and the sleep debt level at four hours.

The Jet Logger 1 as shown in FIG. 12 tells several important things. One is that the person will have a difficult time sleeping between 4:30 and 8:00 am. The person may fall asleep quickly at 4:30 am, but will awaken in about a half hour when the sleep drive 7 dips below the circadian wake drive 3. Since the photo zone east 27 begins around 4:00 am and continues to rise until the wake nadir 25, which occurs about 1:30 pm, it is important that the person avoid light and stay inactive during that time. The sleep drive 7 will show a saw tooth pattern above and the circadian wake drive 3 until about 8:00 am. The person will then be able to sleep soundly until after the wake nadir 25. Before going to sleep it is important to make the room as light proof as possible. If one has to awaken before 1:30 pm, wear dark glasses until that time.

First Morning at Destination

Let us say a person was able to sleep until 8:00 am. The person spent nine hours in bed, but must deduct half of the four hours of poor quality sleep. That leaves the person with a net of seven hours of sleep, one hour less than usual.

5. Move sleep debt level 17 upward one row to level 4. That move is based on the assumption the person was able to spend most of the afternoon in the sunlight after being in darkness during the photo zone east 27. That should cause the circadian wake drive 3 to advance two hours rather than the usual one hour per day.

6. Move the time zone indicator 11 two time zones leftward to time zone 7. The Jet Logger 1 should now look like FIG. 13.

Second Night

Repeat step 4. Let us say the person is able to resist napping during the day and go to sleep again at 4:00 am.

4a. No adjustment to bedtime.

Second Morning

Repeat steps 5-6. The person sleeps until 11:00 am. That gives the person seven hours in bed, which is one hour less than the usual. Also the quality of sleep was poor between 4:30 am and 6:30 am.

5a. Move sleep debt level 17 upward a total of two hours to level 6 (one hour for quantity and one hour for quality of sleep). Notice that the person's wake nadir 25 occurred at 11:30 am that morning. That assumes that the person got several hours of sunlight between noon and 4:30 pm in addition to the darkness before the wake nadir 25. That causes the circadian wake drive 3 to again advance two hours rather than the usual one hour.

6a. Move the time zone indicator 11 two time zones leftward to time zone 5. The Jet Logger 1 should now look like FIG. 14.

Third Night

Repeat step 4. Tonight the person should be able to go to sleep at 2:00 pm.

4b. Move the bedtime indicator 15 two hours leftward to 2:00 am and the sleep debt indicator 17 two rows downward to indicate four hours sleep debt. The Jet Logger 1 should look like FIG. 15.

Third Morning

Repeat steps 5-6. The person sleeps until 9:00 pm. That again gives the person seven hours in bed, including poor quality of sleep between 2:30 and 4:30 am, resulting in two hours increase in sleep debt.

5b. Move the sleep debt level 17 upward two hours to level 6. This assumes the person got the optimum darkness and bright light around the wake nadir 25, which occurred that morning at 9:30.

6b. Move the time zone indicator 11 two time zones leftward to time zone 3. The Jet Logger 1 should now look like FIG. 16.

Fourth Night

Repeat step 4. Tonight the person should be able to go to sleep at midnight.

4c. Move the bedtime indicator 15 and sleep point 23 two hours leftward to midnight and two rows downward to indicate four hours sleep debt. The Jet Logger 1 should now look like FIG. 17, which is similar to both FIGS. 13 and 15. The only difference is the circadian wake drive 3 is four hours ahead of that in FIG. 13 and two hours ahead of that in FIG. 15. That enables the person to go to sleep two hours earlier than the previous night.

Fourth Morning

Repeat steps 5-6. The person sleeps until 7:00 pm. That again gives the person seven hours in bed, including poor quality of sleep between 12:30 and 2:30 am, resulting in two hours increase in sleep debt.

5c. Move the sleep debt level 17 upward two hours to level 6. That assumes the person gets the optimum darkness and bright light around the wake nadir 25, which occurred that morning at 7:30 am.

Figure 18:
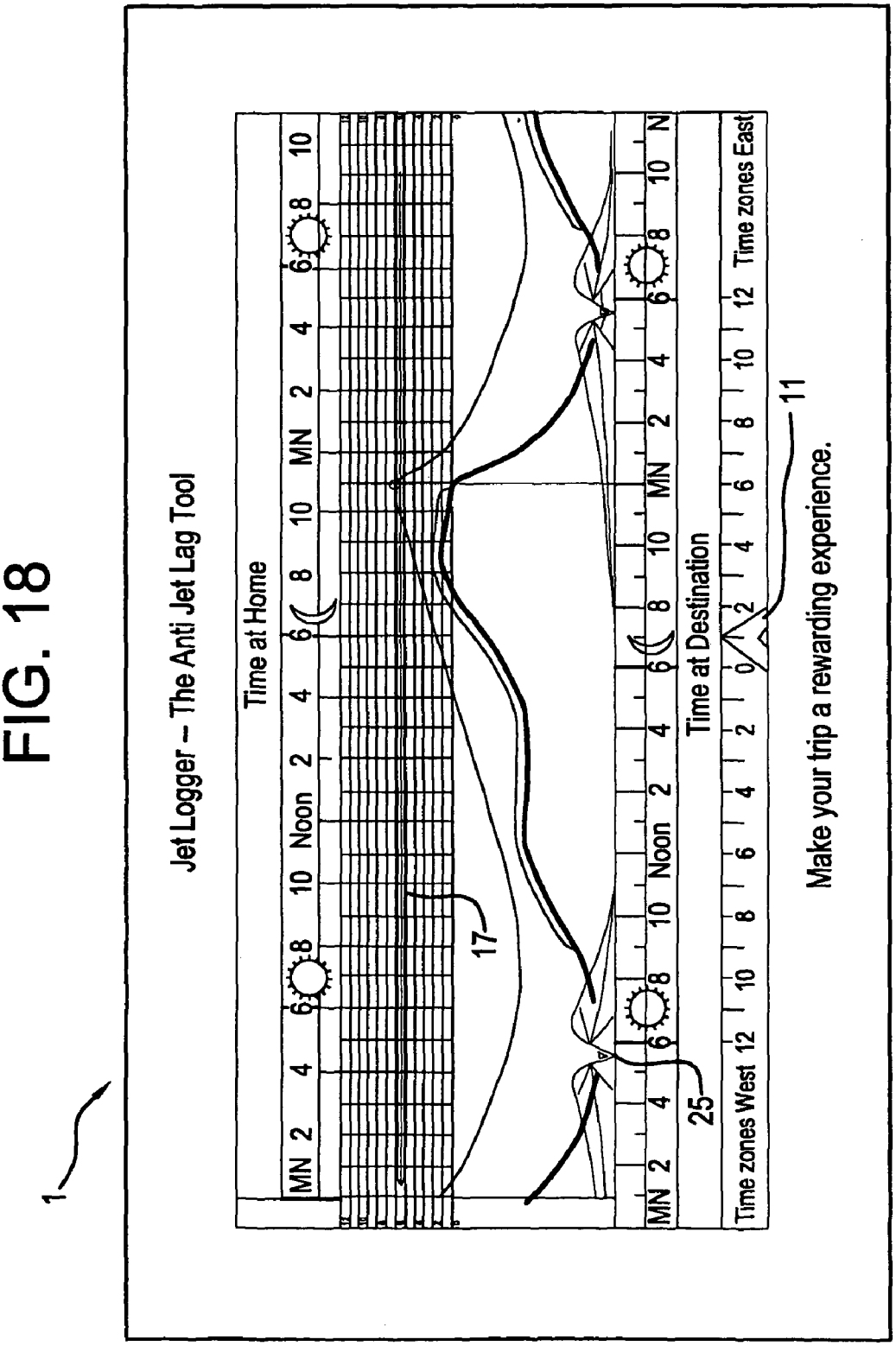
FIG. 18 shows effects on a Jet Logger chart with the time zone indicator at one-hour east and the sleep debt level at six hours.
Figure 19:
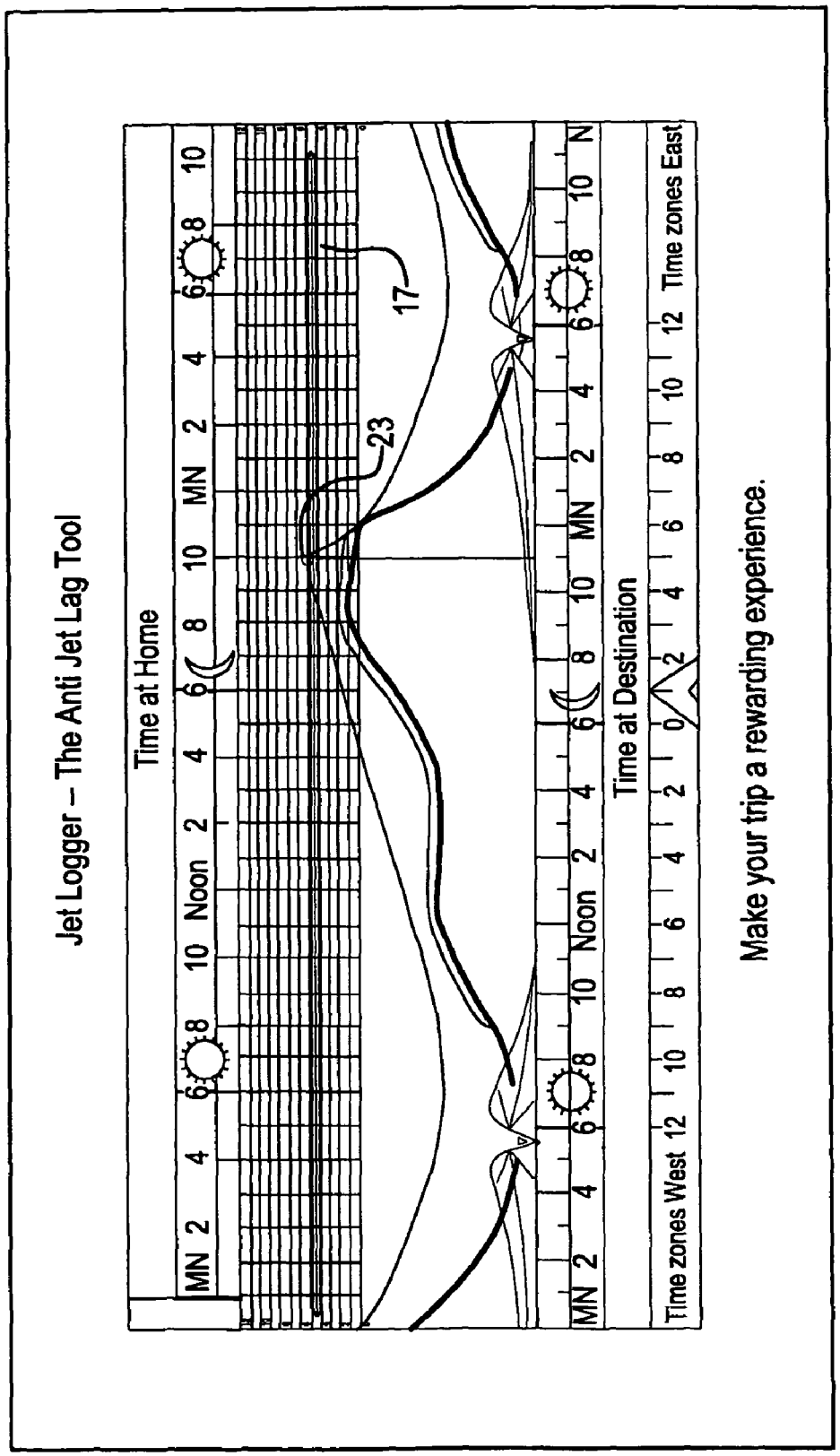
FIG. 19 shows a Jet Logger chart similar to FIG. 18 with the time zone indicator at one-hour east and the sleep debt level at five hours.
Figure 20:
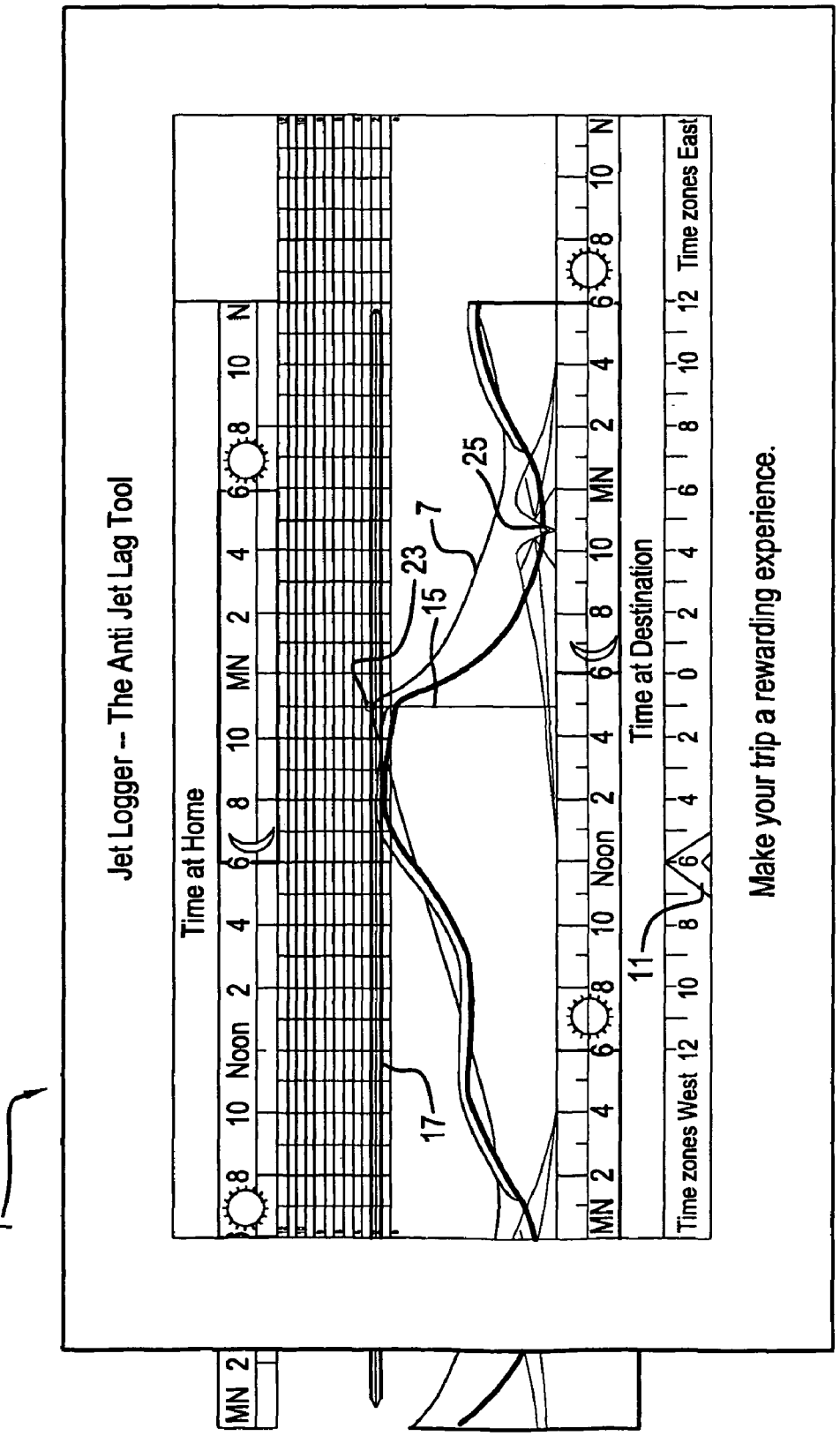
FIG. 20 shows a Jet Logger chart with the time zone indicator at six hours west and the sleep debt level at two hours.
Figure 21:
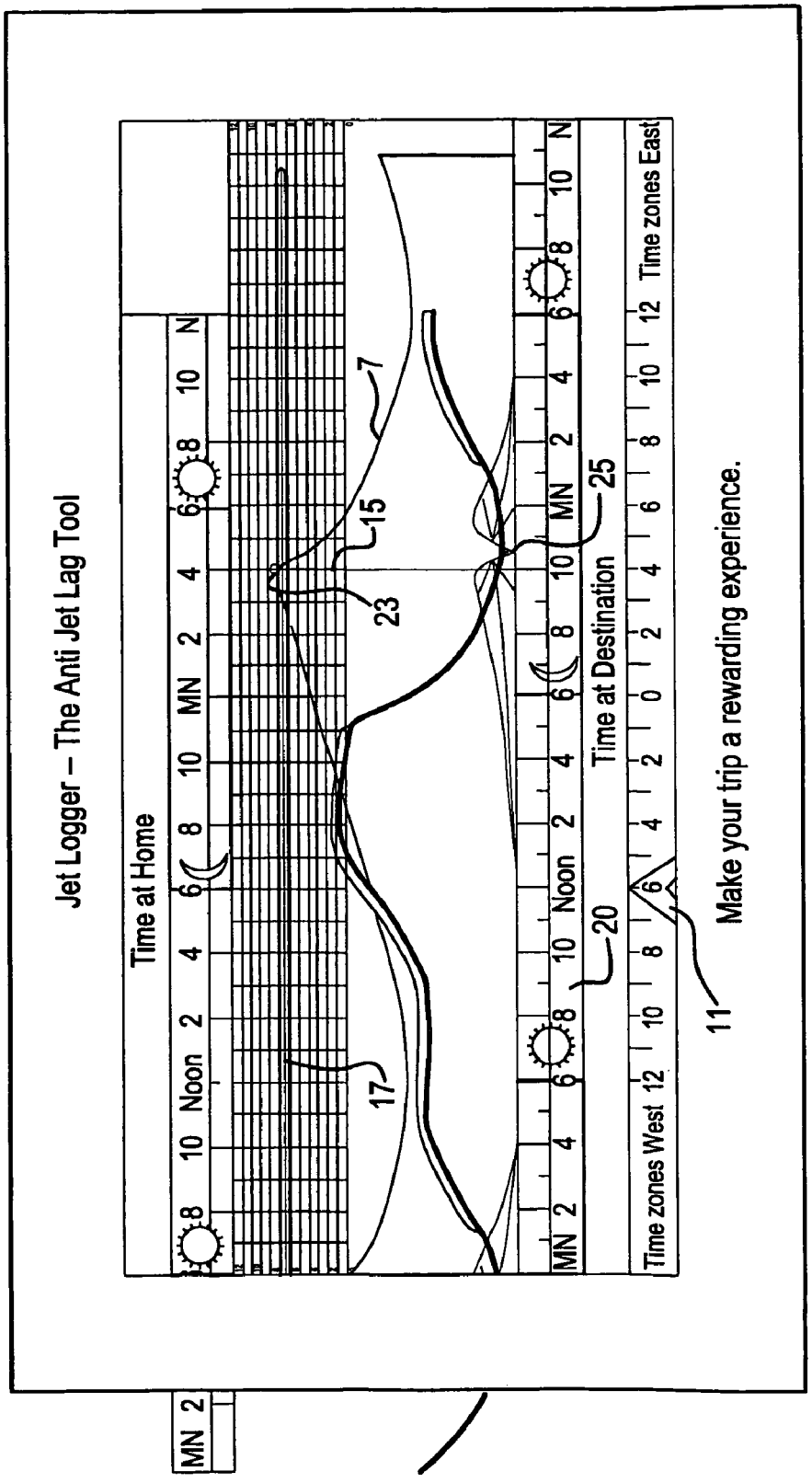
FIG. 21 shows a Jet Logger chart with the time zone indicator at six hours west and the sleep debt level at seven hours.
Figure 22:
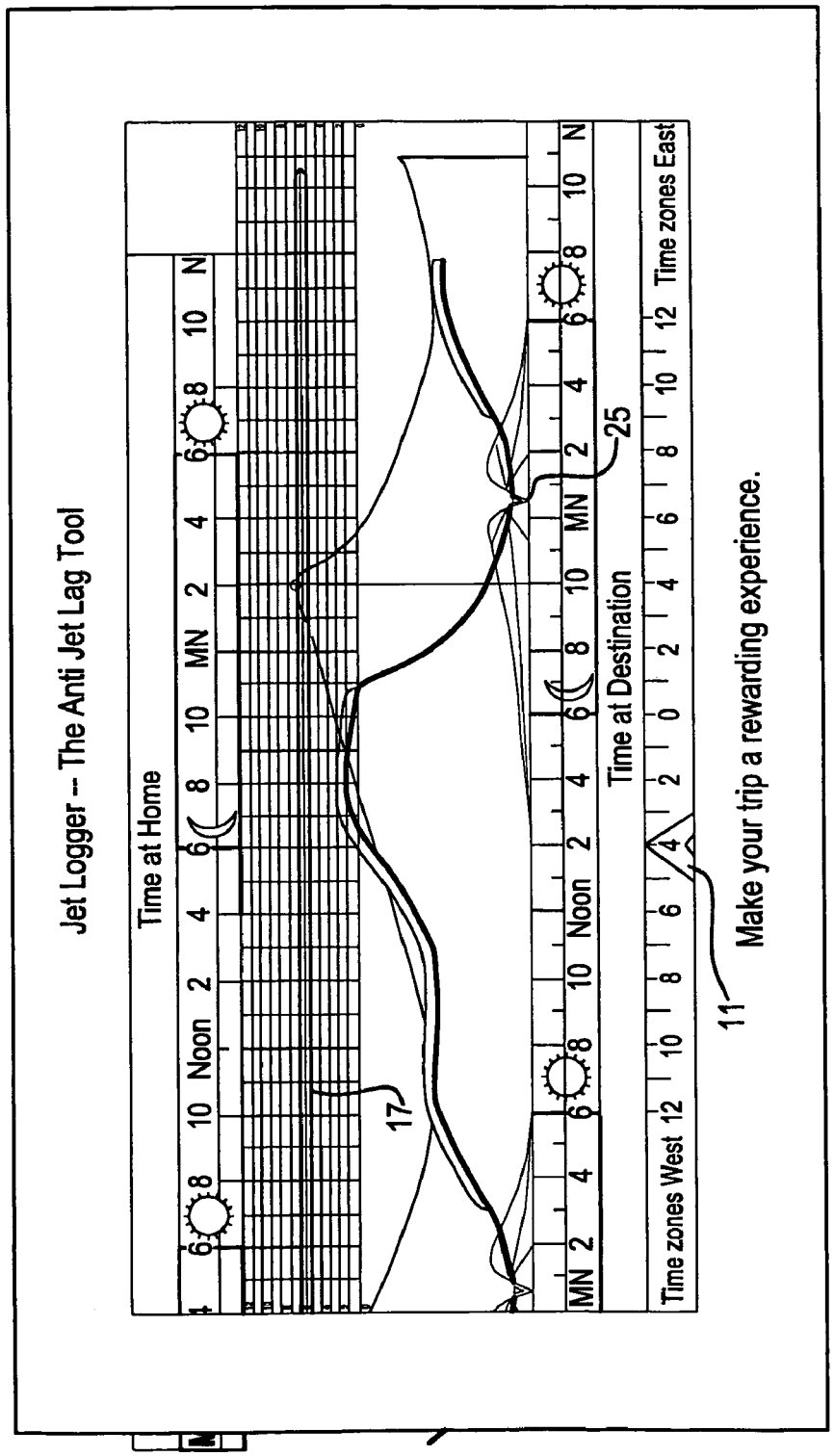
FIG. 22 shows a Jet Logger chart with the time zone indicator at four hours west and the sleep debt level at six hours.
Figure 23:
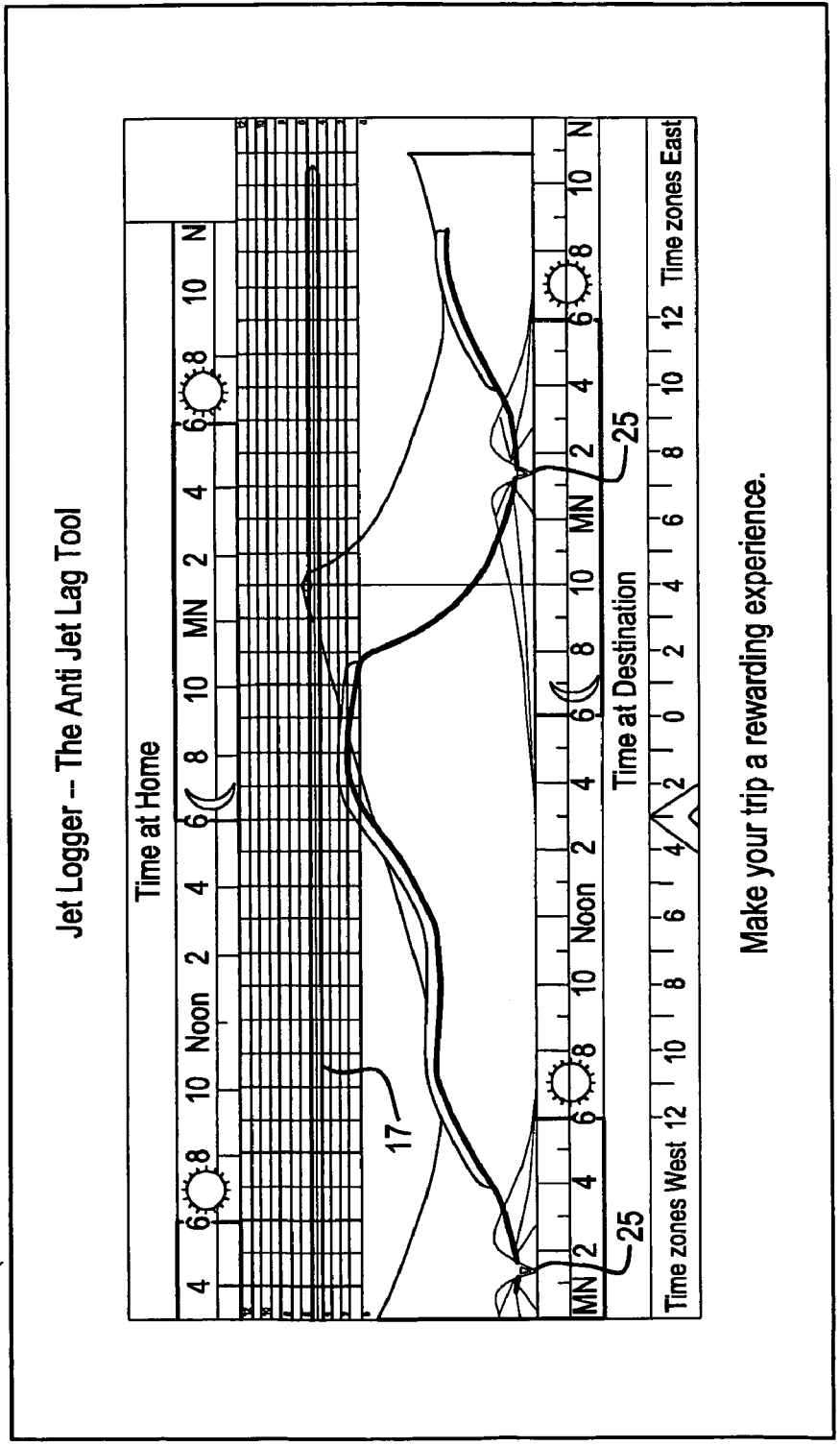
FIG. 23 shows a Jet Logger chart with the time zone indicator at three hours west and the sleep debt level at five hours.

6c. Move the time zone indicator 11 two times zone leftward to time zone 1. The Jet Logger 1 should now look like (FIG. 18)

Fifth Night

Repeat step 4. Tonight the person should be able to go to sleep at 11:00 pm.

4d. Move the bedtime indicator 15 and sleep point 23 one hour leftward to 11:00 pm and one row downward to indicate five hours sleep debt. The Jet Logger 1 should now look like FIG. 19.

Fifth Morning

Repeat steps 5-6. The person got the normal quantity and quality of sleep last night.

5d. No adjustment to sleep debt.

6d. Move the time zone indicator 11 one time zone leftward to time zone O.

Sixth Night

The person's circadian rhythm is back to normal, so the person is now able to go to bed earlier than the usual time at home if the person would like to reduce the sleep debt.

Westbound, Six Time Zones, Daytime Flight.

Let us assume a person will arrive at the destination early evening.

Before Departure

We assume the person has a high normal sleep debt.

1. Move the sleep debt level 17 to the four hour level.

2. Move the time zone indicator 11 six time zones to the left, and return the bedtime indicator 15 to 11:00 pm at home.

On Arrival

During the flight the person slept two hours.

3. Move the sleep debt level 17 downward two hours to row 2. The Jet Logger 1 should look like FIG. 20. Notice that 11:00 pm at home time 22 is 5:00 pm at destination time 20. Although the person can fall asleep any time after 5:00 pm, it is not advisable to do so since the person would then have difficulty sleeping beyond 2:00 am. The person should try to stay up until 10:00 pm (4:00 am at home) gaining as much exposure to bright light as possible up to but not beyond that time (10:00 pm) since the wake nadir 25 is at 10:30 pm.

First Night after Arrival

Let us say the person goes to bed at 10:00 pm. Look at FIG. 20 to see where the person's sleep drive 7 will be at that time. That is where the sleep point 23 must now be moved. Remember every one hour the bedtime indicator 15 is moved rightward the sleep debt level 17 must be moved one row upward.

4. Move the sleep point 23 five hours rightward to 10:00 pm and five rows upward to indicate seven hours sleep debt. The Jet Logger 1 should look like FIG. 21.

First Morning at Destination

Assume the person sleeps until 7:00 am. The person received one hour more than the usual amount of sleep.

5. Move sleep debt level 17 downward one hour to row 6. That assumes the person got ample bright light before going to bed at 10:00 pm and slept in darkness after the wake nadir 25 at 10:30 pm.

6. Move the time zone indicator 11 two hours rightward to time zone 4. The Jet Logger 1 should look like FIG. 22.

Second Night

Repeat step 4. The person goes to sleep at 10:00 pm.

4a. No adjustment to sleep point.

Second Morning

Repeat steps 5-6. The person again sleeps nine hours until 7:00 pm.

5a. Move sleep debt level downward one hour to level 5. The person's wake nadir 25 occurred at 12:30 am, and the person was unable to be exposed to bright light several hours prior to it.

6a. Move the time zone indicator 11 one hour rightward to time zone 3. The Jet Logger 1 should look like FIG. 23.

Third Night

Repeat step 4. The person again goes to sleep at 10:00 pm.

4b. No adjustment to sleep point.

Third Morning

Repeat steps 5-6. The person again sleeps nine hours until 7:00 pm.

5b. Move sleep level downward one hour to level 4.

6b. Move the time zone indicator 11 one time zone rightward to time zone 2. The Jet Logger 1 should look like FIG. 24.

Fourth Night

Figure 24:
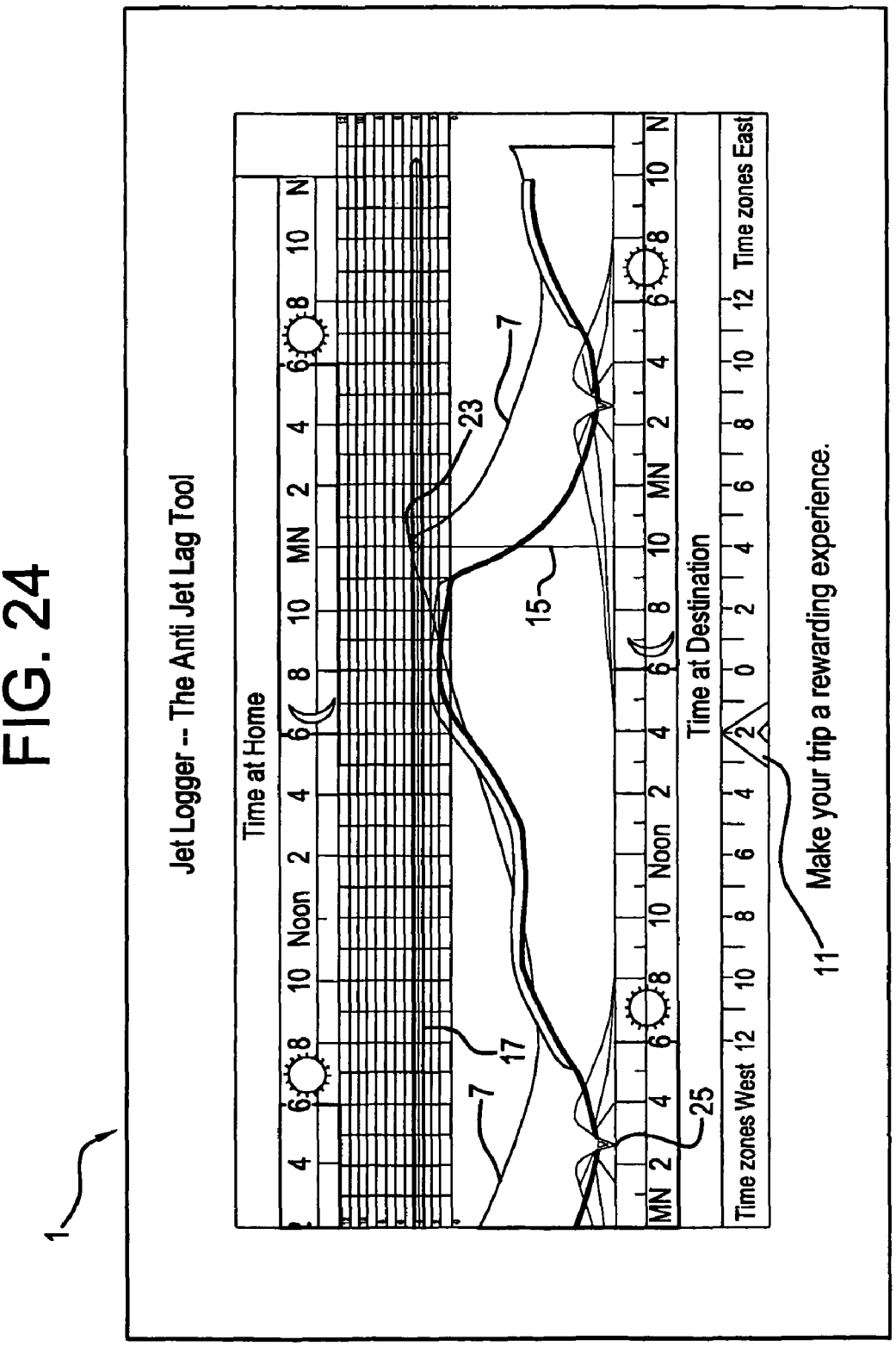
FIG. 24 shows a Jet Logger chart with the time zone indicator at two hours west and the sleep debt level at four hours.

Repeat step 4. FIG. 24 indicates that the person's energy levels during the day are approximately normal except for the late evening. The person should now be able to go to sleep at 9:00 pm and sleep until 7:00 am.

4c. Move sleep point 23 one hour leftward to 9:00 pm and one row downward to indicate three hours of sleep debt.

Fourth Morning

Repeat steps 5-6. The person slept two hours more than the usual.

5c. Move sleep debt level 17 downward two hours to level 1.

6c. Move the time zone indicator 11 one time zone rightward to time zone 1. The Jet Logger 1 should look like FIG. 25.

Fifth Night

Figure 25:
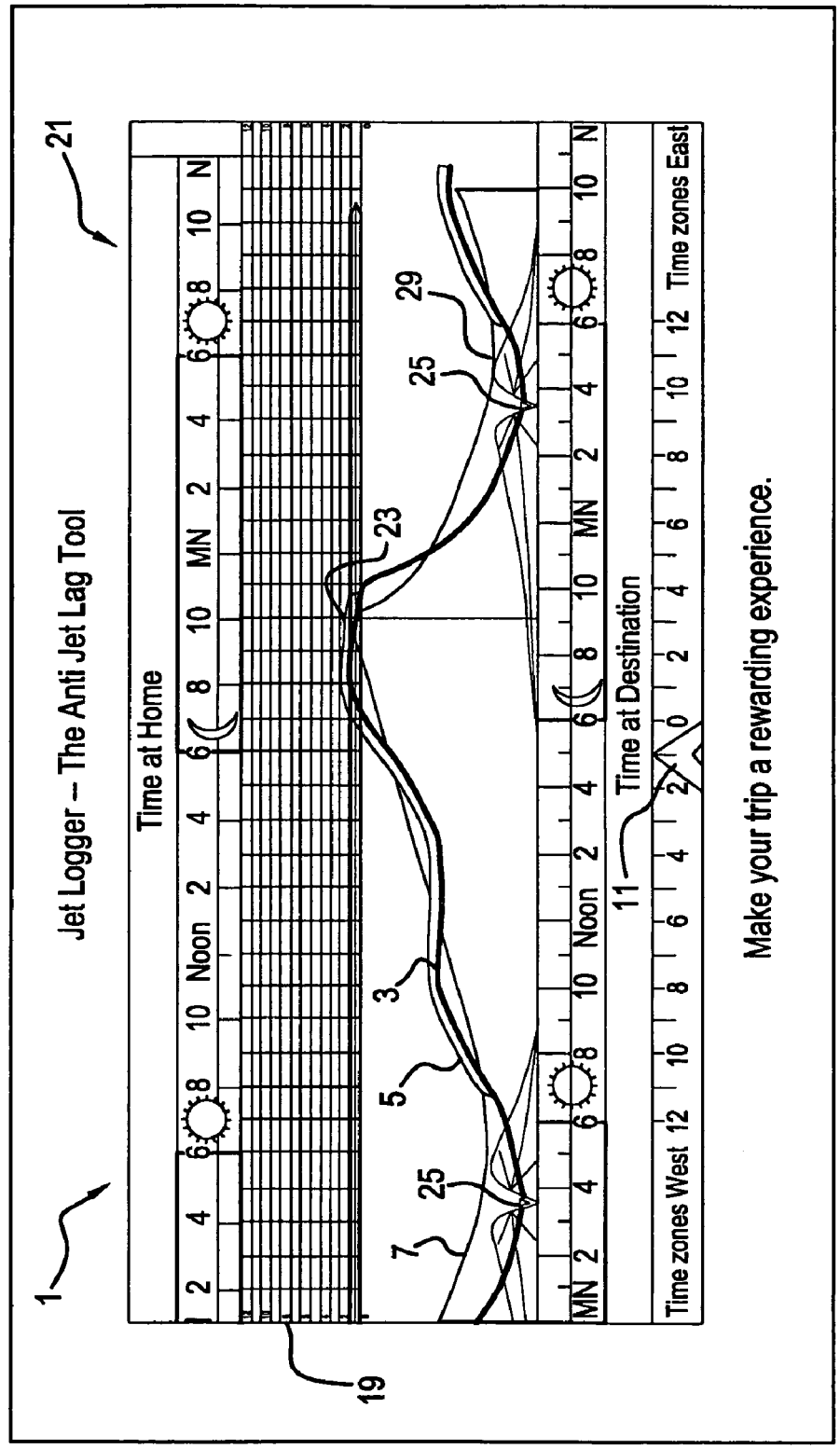
FIG. 25 shows a return to near normal with the time differential displaced only one hour.

FIG. 25 indicates that the person's energy levels are now high all day and late evening. The person should be able to go back to the regular 11:00 pm to 7:00 am sleep schedule.

Figure 26:
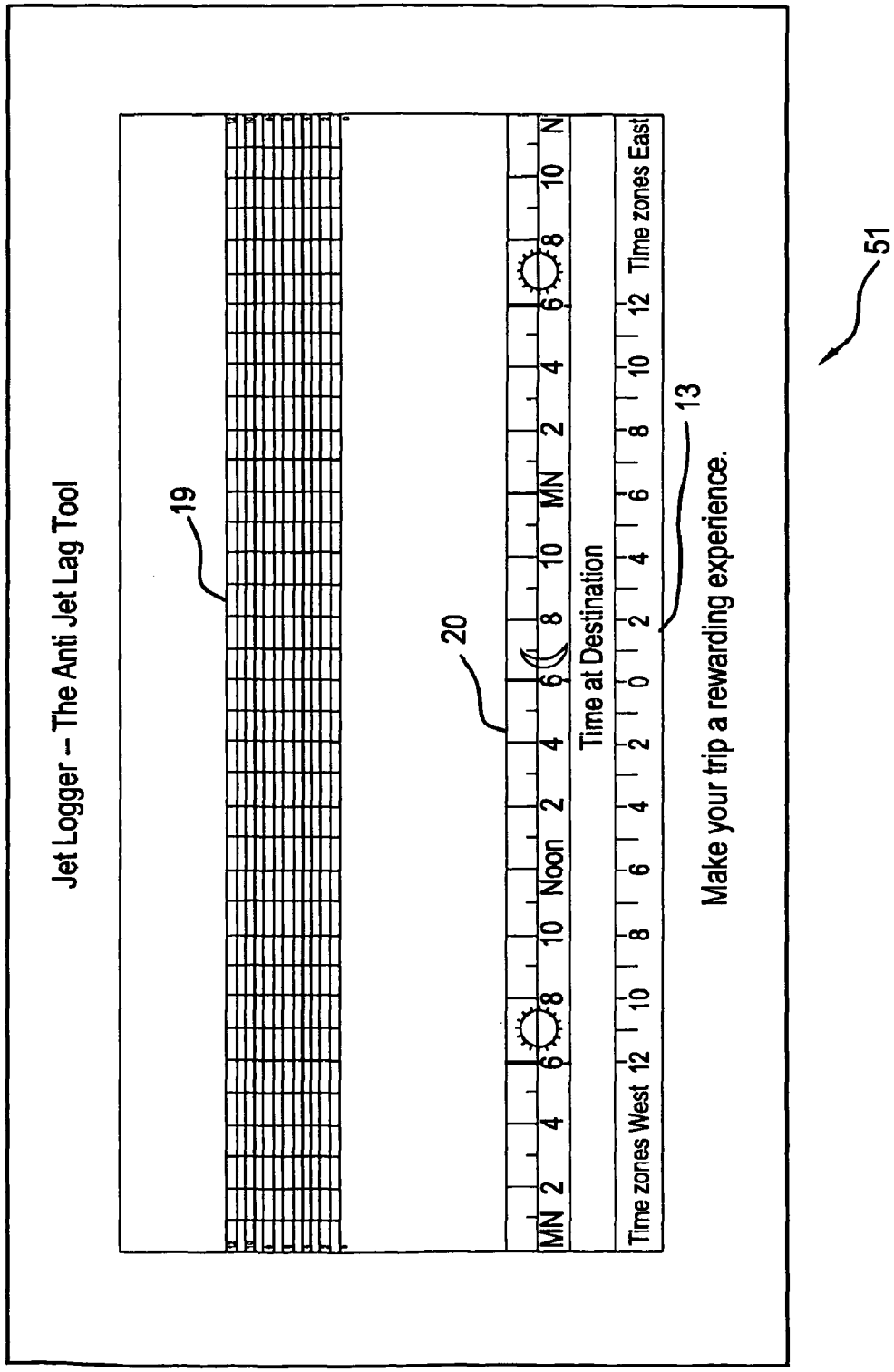
FIG. 26 shows a chart base with a sleep debt scale, a time at destination indicator and a time zone indicator.

Referring to FIG. 26 a chart base 51 has a sleep debt scale 19, a time at destination indicator 20 and a time zone indicator 11.

Figure 27:
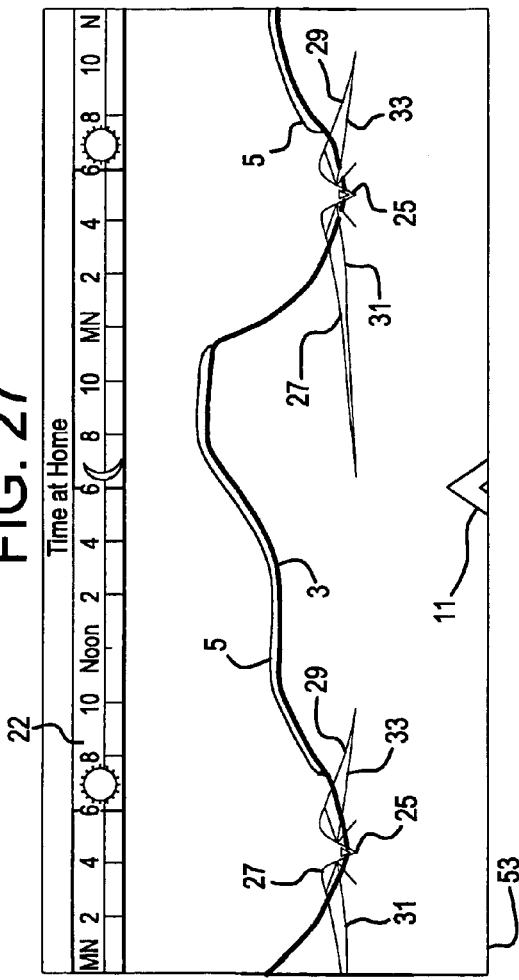
FIG. 27 shows a transparent overlay for moving left and right with a home time indicator, wake drive indicators and a time zone selector.

Referring to FIG. 27 a transparent overlay 53 overlies the chart base 51 and moves left and right. Overlay 53 has a home time indicator 22, lines to represent wake drives 3 and 5 and a time zone selector 11.

Figure 28:
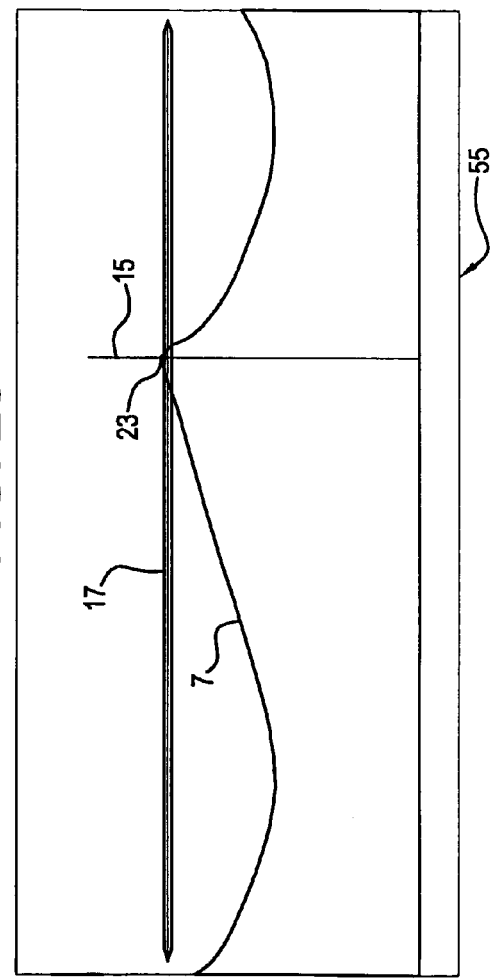
FIG. 28 shows a second transparent overlay for moving up and down and left and right with sleep drive, sleep debt, sleep point, and sleep time indicators.

Referring to FIG. 28 a second transparent overlay 55 overlies chart base 51 and overlies or underlies transparent overlay 53 and moves up and down and left and right. Transparent overlay 55 has a transparent hatched wave shape to show sleep drive 7, and has sleep debt indicator 17, sleep point indicator 23, and bedtime indicator 15.

Assembling the base chart 51 and overlays 53 and 55 forms the charts 1 of FIGS. 1-25.

A frame, not shown holds the overlays on the chart to form an adjustable Jet Lag Forecaster 1.

The base chart and overlay are preferably reproduced in software in a computer so that a hard drive or replaceable drive may be used with a laptop or hand-held computer to chart, predict, and record sleep and wake drive relationships and times of effectiveness.

Figure 29:
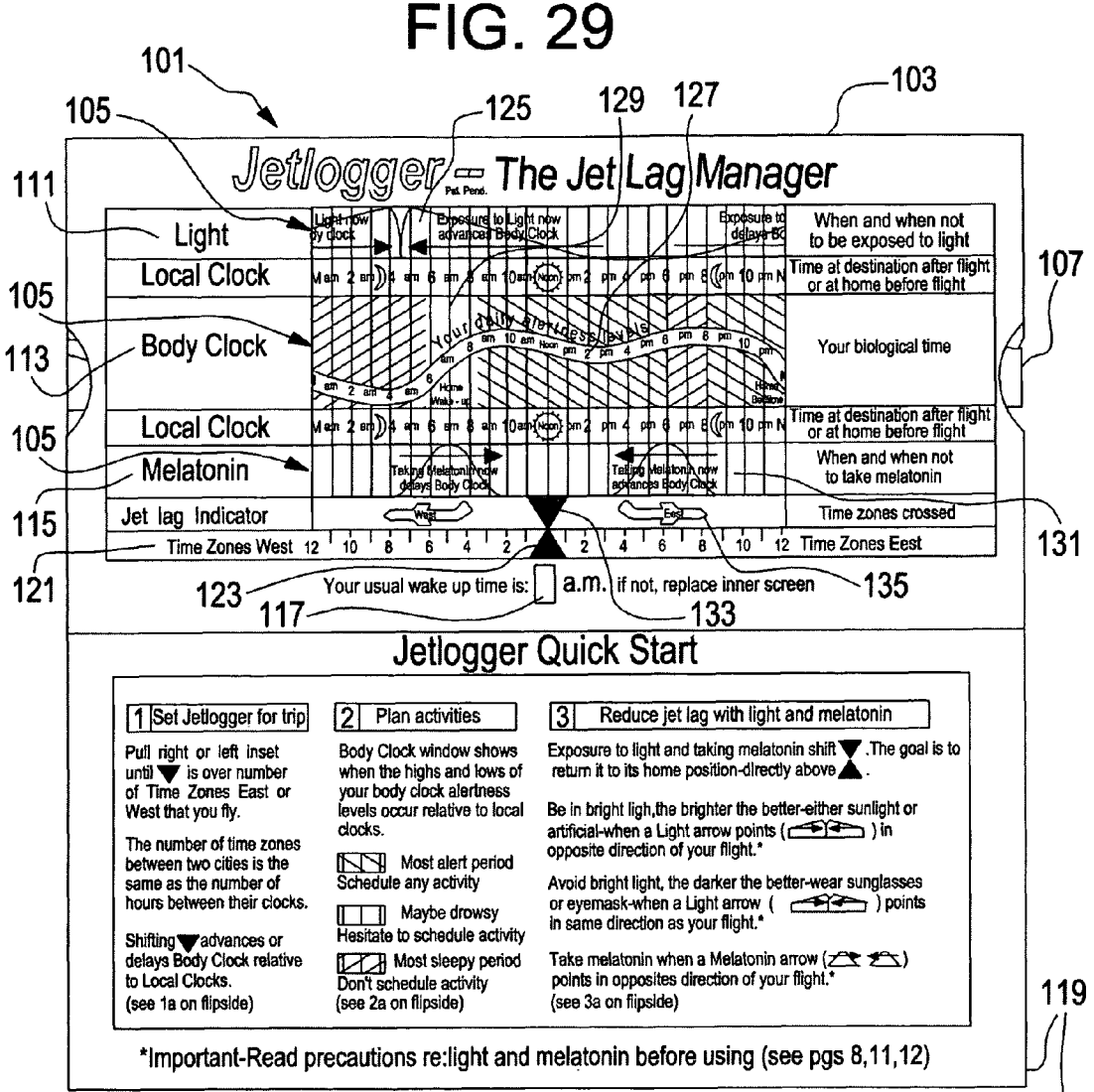
FIG. 29 is an alternative embodiment showing a rectangular form and associated instructions.

FIG. 29 shows another alternative embodiment of a jet lag forecaster chart 101. The chart 101 includes a base sleeve 103 that may or may not be connected to accompanying instructions sheets 119 or booklets. The instruction sheets 119 or booklets describe the purpose and functionality of the jet lag forecaster chart 101. A slide 107 is inserted into the base sleeve 103.

The base sleeve 103 may have one or more openings 105 that reveal information on the slide 107 located within the base sleeve 103. The base sleeve 103 generally has one or more indications of a local clock 109. The local clock 109 represents the time at a destination after a flight or at home before a flight. Other indicators include a time zone indicator 121.

The slide 107 contains information viewable through the openings 105 of the base sleeve 103. A jet lag forecaster chart 101 may come with one or more slides 107. Each slide 107 is individualized for a specific wake time 117. For example, one slide 107 may show information for a normal wake up time of 7 a.m., while a different slide 107 may show information for a normal wake up time of 9 a.m. Each individual's sleep and wake drives take on a similar shape. Therefore, the jet lag forecaster is useful for each individual user. The generic human responses to light and melatonin, as well as general alertness, are shown in the Figures. Selecting a normal wake up time 117 performs individualization. The openings 105 reveal information on the slide 107, such as responses to light 111, biological alertness 113 and responses to melatonin 115. The base sleeve 103 also includes a time zone counter 121. A triangle or other shape 123 indicates a central base time.

In a preferred embodiment, the base sleeve 103 would have three openings revealing information on responses to light 111, biological alertness 113 and responses to melatonin 115 in separate openings.

The slide 107 contains information complementary to the information on the base sleeve 103. Information on responses to light 111 shows the best times of day to seek and avoid light. Indicators may include arrows and graphs 125 to indicate the strength and direction of the effect of light. Information on biological alertness 113 includes a wavy line 127 representing overall alertness levels. The slide 107 may also include colored indicators of alertness levels. For example, lighter colors indicate higher alertness levels and darker colors represent lower alertness levels. Alternatively, high alertness may be shown in green, medium alertness in yellow and low levels of alertness in red. Other combinations of indicators are possible. The information on biological alertness 113 may also include indicators of home bedtime and wake up time 129. Information on responses to melatonin 115 shows the best times of day to take or avoid taking melatonin. Indicators may include arrows and graphs 131 to indicate the strength and direction of the effect of melatonin. The slide 107 also contains a triangular or other shape 133 complementary to the shape 123 on the base sleeve 103. When the shapes 123, 133 are aligned, no jet lag is present. The slide 107 may also contain directional indicators 135 to show a user which direction to move the slide 107 when moving east or west.

The embodiment of FIG. 29 is used in a similar manner to those embodiments described above. A user moves the slide 107 relative to the base sleeve 103 based on the number of time zones crossed. The user then looks to determine the best times of day to schedule activity, seek or avoid light, or take or avoid melatonin. The jet lag forecaster chart 101 allows a user to successfully optimize travel plans and minimize the effects of jet lag. The user then adjusts the relative positions of the base sleeve 103 and the slide 107 based upon the amount of sleep, exposure to light and taking of melatonin. The process is repeated until no more jet lag exists.

FIG. 30 shows another alternative embodiment of a jet lag forecaster chart 201. The chart 201 includes a base sleeve 203 that may or may not be connected to accompanying instructions sheets 219 or booklets. The instruction sheets 219 or booklets describe the purpose and functionality of the jet lag forecaster chart 201. A slide 207 is inserted into the base sleeve 203.

The base sleeve 203 may have one or more openings 205 that reveal information on the slide 207 located within the base sleeve 203. The base sleeve 203 generally has one or more indications of a local clock 209. The local clock 209 represents the time at a destination after a flight or at home before a flight. Other indicators include a time zone indicator 221.

The slide 207 contains information viewable through the openings 205 of the base sleeve 203. A jet lag forecaster chart 201 may come with one or more slides 207. Each slide 207 is individualized for a specific wake time 217. For example, one slide 207 may show information for a normal wake up time of 7 a.m., while a different slide 207 may show information for a normal wake up time of 9 a.m. Each individual's sleep and wake drives take on a similar shape. Therefore, the jet lag forecaster is useful for each individual user. The generic human responses to light and melatonin, as well as general alertness, are shown in the Figures. Selecting a normal wake up time 217 performs individualization. The openings 205 reveal information on the slide 207, such as responses to light 211, biological alertness 213 and responses to melatonin 215.

The base sleeve 203 also includes a time zone counter 221. A triangle or other shape 223 indicates a central base time.

In a preferred embodiment, the base sleeve 203 would have three openings revealing information on responses to light 211 and to melatonin 215, biological alertness 213, and time zones crossed 233 in separate openings.

The slide 207 contains information complementary to the information on the base sleeve 203. Information on responses to light 211 shows the best times of day to seek and avoid light. Indicators may include arrows and graphs 225 to indicate the strength and direction of the effect of light. Information on biological alertness 213 includes a wavy line 227 representing overall alertness levels. The slide 207 may also include colored indicators of alertness levels. For example, lighter colors indicate higher alertness levels and darker colors represent lower alertness levels. Alternatively, high alertness may be shown in green, medium alertness in yellow and low levels of alertness in red. The wavy line 227 may be colored similarly. Other combinations of indicators are possible. The information on biological alertness 213 may also include indicators of home bedtime and wake up time 229. Information on responses to melatonin 215 shows the best times of day to take or avoid taking melatonin. Indicators may include arrows and graphs 231 to indicate the strength and direction of the effect of melatonin. The slide 207 also contains a triangular or other shape 233 complementary to the shape 223 on the base sleeve 203. When the shapes 223, 233 are aligned, no jet lag is present. The slide 207 may also contain directional indicators 235 to show a user which direction to move the slide 207 when moving east or west.

The embodiment of FIG. 30 is used in a similar manner to those embodiments described above. A user moves the slide 207 relative to the base sleeve 203 based on the number of time zones crossed. The user then looks to determine the best times of day to schedule activity, seek or avoid light, or take or avoid melatonin. The jet lag forecaster chart 201 allows a user to successfully optimize travel plans and minimize the effects of jet lag. The user then adjusts the relative positions of the base sleeve 203 and the slide 207 based upon the amount of sleep, exposure to light and taking of melatonin. The process is repeated until no more jet lag exists.

Figure 31:
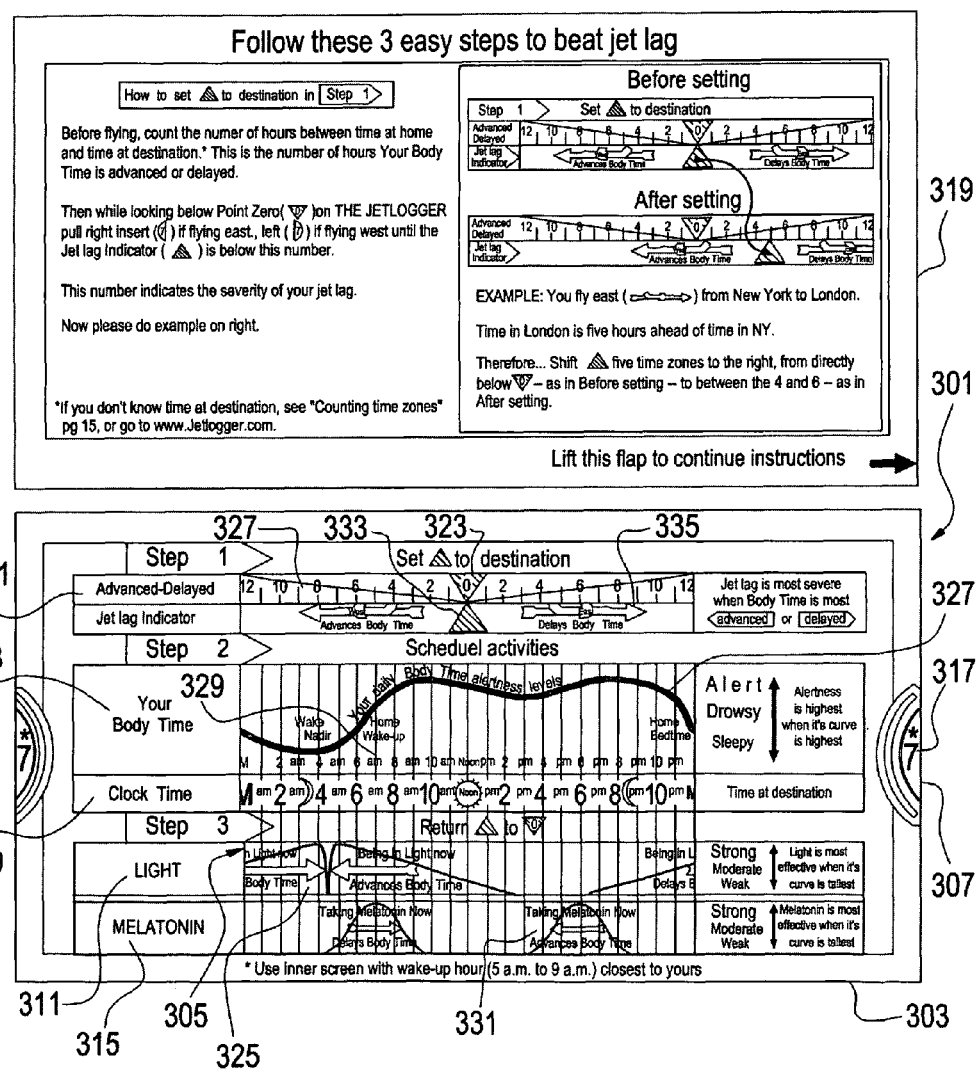
FIG. 31 is another alternative embodiment showing a rectangular form and associated instructions.

FIG. 31 shows another alternative embodiment of a jet lag forecaster chart 301. The chart 301 includes a base sleeve 303 that may or may not be connected to accompanying instructions sheets 319 or booklets. The instruction sheets 319 or booklets describe the purpose and functionality of the jet lag forecaster chart 301. A slide 307 is inserted into the base sleeve 303.

The base sleeve 303 may have one or more openings 305 that reveal information on the slide 307 located within the base sleeve 303. The base sleeve 303 generally has one or more indications of a local clock 309. The local clock 309 represents the time at a destination after a flight or at home before a flight. Other indicators include a time zone indicator 321.

The slide 307 contains information viewable through the openings 305 of the base sleeve 303. A jet lag forecaster chart 301 may come with one or more slides 307. Each slide 307 is individualized for a specific wake time 317. For example, one slide 307 may show information for a normal wake up time of 7 a.m., while a different slide 307 may show information for a normal wake up time of 9 a.m. Each individual's sleep and wake drives take on a similar shape. Therefore, the jet lag forecaster is useful for each individual user. The generic human responses to light and melatonin, as well as general alertness, are shown in the Figures. Selecting a normal wake up time 317 performs individualization. The openings 305 reveal information on the slide 307, such as responses to light 311, biological alertness 313 and responses to melatonin 315. The base sleeve 303 also includes a time zone counter 321. Shapes on the counter 337 may indicate the extent to which body time is advanced or delayed. The color of the shapes may indicate the direction of the alteration of body time. Thus one color may indicate an advanced body time and another a delayed body time. A triangle or other shape 323 indicates a central base time.

In a preferred embodiment, the base sleeve 303 would have three openings revealing information on responses to light 311 and to melatonin 315, biological alertness 313, and time zones crossed 333 in separate openings.

The slide 307 contains information complementary to the information on the base sleeve 303. Information on responses to light 311 shows the best times of day to seek and avoid light. Indicators may include arrows and graphs 325 to indicate the strength and direction of the effect of light. The color and intensity of the graphs or arrows 325 can indicate the direction and intensity of the effect of light. Thus one color may indicate advancing body time and another delaying body time, as shown on the graphs, and the intensity of each color within the graph may indicate the strength with which exposure to light advances or delays body time as shown.

Information on biological alertness 313 includes a wavy line 327 representing overall alertness levels. The slide 307 may also include colored indicators of alertness levels. For example, lighter colors indicate higher alertness levels and darker colors represent lower alertness levels. Alternatively, high alertness may be shown in green, medium alertness in yellow and low levels of alertness in red. The wavy line 327 may be colored similarly. Other combinations of indicators are possible. The information on biological alertness 313 may also include indicators of home bedtime and wake up time 329.

Information on responses to melatonin 315 shows the best times of day to take or avoid taking melatonin. Indicators may include arrows and graphs 331 to indicate the strength and direction of the effect of melatonin. The color and intensity of the graphs or arrows 331 can indicate the direction and intensity of the effect of melatonin. Thus one color may indicate advancing body time and another delaying body time, as shown on the graphs, and the intensity of each color within the graph may indicate the strength with which ingestion of melatonin advances or delays body time as shown. The slide 307 also contains a triangular or other shape 333 complementary to the shape 323 on the base sleeve 303. When the shapes 323, 333 are aligned, no jet lag is present. The slide 307 may also contain directional indicators 335 to show a user which direction to move the slide 307 when moving east or west.

The embodiment of FIG. 31 is used in a similar manner to those embodiments described above. A user moves the slide 307 relative to the base sleeve 303 based on the number of time zones crossed. The user then looks to determine the best times of day to schedule activity, seek or avoid light, or take or avoid melatonin. The jet lag forecaster chart 301 allows a user to successfully optimize travel plans and minimize the effects of jet lag. The user then adjusts the relative positions of the base sleeve 303 and the slide 307 based upon the amount of sleep, exposure to light and taking of melatonin. The process is repeated until no more jet lag exists.

The jet lag forecaster is not limited to the above-described embodiments. The jet lag forecaster of the present invention may have different shapes and forms. For example, the jet lag forecaster may be square, rectangular, circular or other shapes. The slide is moved relative to a base to identify the alertness levels of a user.

While the invention has been described with reference to specific embodiments, modifications and variations of the invention may be constructed without departing from the scope of the invention, which is defined in the following claims.

I claim:

1. An apparatus for predicting and managing jet lag comprising:
   a base sleeve with information displayed on at least one side,
   one or more openings on a side of the base sleeve,
   a slide with information displayed on a side visible through the one or more openings on the base sleeve,
   complementary indicators on the base sleeve and the slide comprising indicators of a degree of jet lag,
   wherein the slide is movable relative to the base sleeve thereby displaying data indicating changes in alertness levels based on changes in time zones,
   wherein the information on the slide comprises generic human responses to light, biological alertness levels, and responses to melatonin, and
   wherein the information on the base sleeve comprises a time zone counter and one or more indicators of time at a destination after flight or at home before a flight.

2. The apparatus of claim 1, further comprising instruction sheets or booklets connected to the base sleeve.

3. The apparatus of claim 1, further comprising multiple interchangeable slides for personalizing the apparatus based on individual normal wake times.

4. The apparatus of claim 1, wherein the base sleeve has three openings for revealing information on responses to light, biological alertness and responses to melatonin separately.

5. The apparatus of claim 1, wherein the information on responses to light on the slide shows the best times of day to seek and avoid light, and is indicated by arrows and graphs for describing the strength and direction of the effect of light.

6. The apparatus of claim 1, wherein the information on biological alertness on the slide comprises a wavy line representing overall alertness levels, and corresponding shaded or colored indicators of overall alertness levels.

7. The apparatus of claim 1, wherein the information on responses to melatonin on the slide shows the best times of day to take or avoid taking melatonin, and is indicated by arrows and graphs for describing the strength and direction of the effect of melatonin.

8. The apparatus of claim 1, wherein the slide further comprises directional indicators for indicating which direction to move the slide when moving time zones east or west.

9. An apparatus for predicting and managing jet lag comprising: a display, a shape on the display representing daily body time alertness levels, and one or more indications of time of day at a destination location, wherein the shape representing daily body time alertness levels is movable relative to the indications of time of day at a destination location for displaying daily body time alertness levels based on the time of day at a starting location relative to the time of day at the destination location.

10. The apparatus of claim 9, wherein the shape representing daily body time alertness levels shows levels of alertness on a linear time scale and the height of the shape representing daily body time alertness levels in an axis perpendicular to a time line axis indicates the relative level of alertness.

11. The apparatus of claim 10, wherein a wake nadir is specifically identified on the shape representing daily body time alertness levels, and wherein the point on the shape representing daily body time alertness levels identified as the wake nadir has the least height in the axis perpendicular to the time line axis of any point on the shape representing daily body time alertness levels.

12. The apparatus of claim 9, wherein the display further comprises shapes representing generic human responses to light and melatonin that correspond to the shape representing daily body time alertness levels and are movable along with the shape representing daily body time alertness levels relative to the indications of time of day at a destination location.

13. The apparatus of claim 12, wherein the shapes representing generic human responses to light and melatonin show the relative strength and direction of the force of the responses on a linear time line.

14. The apparatus of claim 13, wherein colors of the shapes representing generic human responses to light and melatonin indicate the direction and strength of their force.

15. The apparatus of claim 13, wherein the height of the shapes representing generic human responses to light and melatonin in an axis perpendicular to a time line axis indicates the relative strength of the force of the responses.

16. The apparatus of claim 9, wherein the display further comprises a time zone counter that indicates the number of time zones between the starting location and the destination location when the shape on the display representing daily body time alertness levels is moved relative to the indications of time of day at a destination location.

17. The apparatus of claim 9, wherein the shape on the display representing daily body time alertness levels is personalized based on individual normal wake times.

18. The apparatus of claim 9, wherein the display further comprises indications of time of day at a starting location that correspond to the shape representing daily body time alertness levels.

19. The apparatus of claim 9, wherein the display further comprises color corresponding to the shape representing daily body time alertness levels that indicates the relative level of alertness at one or more points along the shape.

20. The apparatus of claim 9, wherein the display further comprises a slide and a sleeve and wherein the shape on the display representing daily body time alertness levels is on the slide and the one or more indications of time of day at a destination location are on the sleeve.

21. The apparatus of claim 20, further comprising shapes on the display representing generic human responses to light and melatonin that correspond to the shape representing daily body time alertness levels and are movable along with the shape representing daily body time alertness levels relative to the indications of time of day at a destination location, wherein the shapes representing generic human responses to light and melatonin are also on the slide, wherein the shape on the display representing daily body time alertness levels is personalized based on individual normal wake times and the display further comprises indications on the slide of time of day at a starting location that correspond to the shape representing daily body time alertness levels.

22. A method of predicting and managing jet lag comprising a display device for displaying daily body time alertness levels based on a time of day at a starting location and at a destination location, displaying the effect on the daily body time alertness levels of exposure to light at different times or of taking melatonin at different times, accounting for recovery time and exposure to light or melatonin consumption, and redisplaying the daily body time alertness levels.

* * * * *